(12) United States Patent
Shimizu et al.

(10) Patent No.: US 7,892,443 B2
(45) Date of Patent: Feb. 22, 2011

(54) METHOD OF MANUFACTURING MEMBER WITH CONCAVE PORTIONS, MEMBER WITH CONCAVE PORTIONS, LENS SUBSTRATE, TRANSMISSION TYPE SCREEN AND REAR PROJECTION

(75) Inventors: Nobuo Shimizu, Nagano (JP); Kazuto Yoshimura, Nagano (JP)

(73) Assignee: Seiko Epson Corporation (JP)

( * ) Notice: Subject to any disclaimer, the term of this patent is extended or adjusted under 35 U.S.C. 154(b) by 1055 days.

(21) Appl. No.: 11/654,308

(22) Filed: Jan. 17, 2007

(65) Prior Publication Data

US 2007/0166849 A1 Jul. 19, 2007

(30) Foreign Application Priority Data

Jan. 18, 2006 (JP) ............................. 2006-010524
Oct. 25, 2006 (JP) ............................. 2006-290243

(51) Int. Cl.
*B44C 1/22* (2006.01)
(52) U.S. Cl. .............................. 216/48; 216/24; 216/65; 430/314; 438/710
(58) Field of Classification Search .................. 216/24, 216/25, 26, 48, 65, 66; 430/314, 316; 438/710, 438/712
See application file for complete search history.

(56) References Cited

U.S. PATENT DOCUMENTS 5,477,304 A * 12/1995 Nishi ........................... 355/53

7,255,806 B2 * 8/2007 Yoshimura et al. ............ 216/65
7,405,385 B2 * 7/2008 Jiang et al. ................ 250/208.1

FOREIGN PATENT DOCUMENTS

| JP | 11-007032 | 1/1999 |
|---|---|---|
| JP | 2001-356335 | 12/2001 |
| JP | 2002-040623 | 2/2002 |
| JP | 2004-286906 | 10/2004 |
| JP | 2004-340985 | 12/2004 |
| JP | 2005-128352 | 5/2005 |
| JP | 2005-258210 | 9/2005 |

* cited by examiner

*Primary Examiner*—Lan Vinh
(74) *Attorney, Agent, or Firm*—Harness, Dickey & Pierce, P.L.C.

(57) ABSTRACT

A method of manufacturing a member with concave portions includes preparing a base material, forming a mask formation film on the base material, forming a number of openings in the mask formation film by laser irradiation treatments using a branching filter, and etching the base material to form the concave portions in the base material. The branching filter branches laser light into first laser beams and second laser beams. Each of irradiation regions of the mask formation film sequentially is subjected to the laser irradiation treatment, so that first openings are formed by the first laser beams and second openings are formed by the second laser beams. Each of the irradiation regions has portions where no opening is formed by the first beams of the laser irradiation treatment for the irradiation region while openings will be formed by the second laser beams in one or more of the subsequent laser irradiation treatments. In the base material, concave portions for examination use are formed using some of the openings formed by the second laser beams used in the laser irradiation treatments for the specified irradiation regions.

4 Claims, 22 Drawing Sheets

METHOD OF MANUFACTURING MEMBER WITH CONCAVE PORTIONS, MEMBER WITH CONCAVE PORTIONS, LENS SUBSTRATE, TRANSMISSION TYPE SCREEN AND REAR PROJECTION

CROSS-REFERENCE TO RELATED APPLICATION

This application claims priorities to Japanese Patent Applications No. 2006-010524 filed on Jan. 18, 2006 and No. 2006-290243 filed on Oct. 25, 2006 which are hereby expressly incorporated by reference herein in their entireties.

BACKGROUND

1. Technical Field

The present invention relates to a method of manufacturing a member with concave portions, a member with concave portions, a lens substrate, a transmission type screen and a rear projection, and more specifically to a method of manufacturing a member with concave portions, a member with concave portions which is manufactured using the manufacturing method, a lens substrate manufactured using the member with concave portions, a transmission screen provided with the microlens substrate, and a rear projection provided with the transmission screen.

2. Related Art

In recent years, there is an increasing demand for rear projections that serve as displays suitable for use in home theater monitors, large-screen televisions and the like. A transmission type screen having a lens substrate (lenticular lens substrate) with lenticular lenses is generally employed in the rear projections.

From a stand point of viewing angle characteristics and so forth, attention is recently being paid to a lens substrate (microlens substrate) that employs microlenses in place of the conventionally used lenticular lenses (see, e.g., JP-A-2004-286906)

In general, the lens substrate as noted above is manufactured using a mold that has a shape corresponding to lens portions (lenticular lenses, microlenses or the like) of a lens substrate targeted for manufacture. Such a mold is produced by, e.g., etching through the use of a mask having openings at its locations corresponding to lens portions (concave portions) which are to be formed on the lens substrate.

In the case where the concave portions are formed on the mold by etching, however, a severe change appears in an etching amount depending on the temperature of an etching solution, the composition thereof or the like. This makes it difficult to reliably manufacture a mold having concave portions of a desired size and shape (e.g., a desired radius of curvature).

Further, the composition of an etching solution varies over time by reiterative etching treatments or other causes. This poses an even severe difficulty in controlling the etching amount.

Such an inability to reliably control the etching amount makes it impossible for the resultant lens substrate to have required optical characteristics, thereby reducing the reliability of the lens substrate and a rear projection provided with the lens substrate.

SUMMARY

It is therefore an object of the present invention to provide a method capable of easily and accurately manufacturing a member with concave portions having concave portions of a desired size and shape, a member with concave portions, a lens substrate manufactured using the member with concave portions, a transmission screen provided with the microlens substrate, and a rear projection.

A first aspect of the invention is directed to a method of manufacturing a member with concave portions. The method comprises preparing a base material, forming a mask formation film on the base material, forming a number of openings in the mask formation film by means of laser processing using a branching filter to obtain a mask, the branching filter having a number of light transmission portions for branching laser light which has been emitted from a laser light source into a plurality of laser beams, the light transmission portions including first light transmission portions arranged in a predetermined region for producing first laser beams and second light transmission portions arranged out of the predetermined region for producing second laser beams, and etching the base material on which the mask has been formed to form the concave portions in the base material, wherein the mask formation film has a plurality of irradiation regions each having a predetermined size, and the laser processing is carried out by performing a laser irradiation treatment with the laser beams branched by the branching filter for each of the plurality of irradiation regions sequentially in a predetermined order to form the openings in the irradiation regions, in which the openings formed by the laser irradiation treatment for each of the irradiation regions including first openings which are formed inside the irradiation region by the first laser beams and second openings which are formed out of the irradiation region by the second laser beams, wherein the first light transmission portions and the second light transmission portions of the branching filter are arranged so that each of the irradiation regions has portions where no opening is formed by the first beams of the laser irradiation treatment for the irradiation region while openings will be formed in the portions of the irradiation region by the second laser beams in one or more of the subsequent laser irradiation treatments, whereby when the laser irradiation treatments have been carried out for all the irradiation regions and then the etching process is completed, a number of concave portions are formed in the base material so that the base material can have an effective area in which the concave portions are formed in a regularly arranged manner and an ineffective area which is positioned out of the effective area and in which concave portions for examination use are formed using some of the openings formed by the second laser beams used in the laser irradiation treatments for the specified irradiation regions.

According to the manufacturing method, it is possible, in the etching step, to form a multiplicity of regularly arranged concave portions in an effective area of the base substrate and a multiplicity of concave portions for examination use in an ineffective area thereof, the concave portions for examination use being used in examining the shape of the concave portions in the effective area formed by etching. As a result, in the etching step, the progress of etching for the base substrate can be properly determined by observing the appearance of the concave portions for examination use.

Further, since the second light transmission portions (the second laser beams) can be used as a datum of aligning the position of each of the irradiation regions, the openings formed in the mask can be kept free from misaligned formation, disarrayed arrangement and so forth. This makes it possible to control a variation in size and shape of the multiplicity of openings formed in the mask. For these reasons, it becomes possible to easily and reliably manufacture the member with concave portions having the concave portions of a suitable size and shape.

It is preferable that the portions of the irradiation region are provided on locations in the irradiation region where openings will be formed by the second laser beams in one or more of the subsequent laser irradiation treatments.

This makes it possible to align the position of each of the irradiation regions more reliably.

It is preferable that in each of the laser irradiation treatments on or after the second laser irradiation treatment, the portions of the irradiation region are also provided on locations in the irradiation region where the openings have already been formed by the second laser beams in one or more of the preceding laser irradiation treatments.

This also makes it possible to align the position of each of the irradiation regions more reliably.

It is preferable that the concave portions for examination use are formed so as to be spaced apart from other concave portions in the ineffective area of the base material.

This makes it possible to more conveniently perform measurement of the size of the concave portions for examination use or other tasks in the etching step, therefore it is possible to accurately control the size, shape or the like of the concave portions (in a effective area) targeted for formation.

It is preferable that the laser irradiation treatments are carried out by relatively moving the base material to the laser light source and the branching filter in a X-direction and a Y-direction orthogonal to the X-direction so that the plurality of irradiation regions are also moved in the same manner, wherein in the branching filter the second light transmission portions arranged at positions spaced apart from the first light transmission portions in the predetermined region in the X-direction and Y-direction.

This makes it possible to accurately control the size, shape or the like of the concave portions (in a effective area) targeted for formation.

It is preferable that the each of the concave portions formed in the effective area has a flattened ellipse shape when viewed from a top of the surface of the base material where the concave portions are formed.

According to a conventional method, if each of the concave portions targeted for formation has a flattened ellipse shape when viewed from a top of the surface of the base material, it is difficult to control the etching amount of the base material by the etching process. In contrast, according to the manufacturing method, it is possible to properly control the etching amount of the base material by the etching process because of provision of the concave portions for examination use, even if each of the concave portions targeted for formation has a flattened ellipse shape. Therefore it is possible to obtain the member with concave portions having concave portions of a desired size and shape. In other words, when each of the concave portions targeted for formation has a flattened ellipse shape, the above-noted advantageous effects becomes more conspicuously.

A second aspect of the invention is directed to a member with concave portions. The member with concave portions is manufactured using the above manufacturing method.

This makes it possible to provide a member with concave portions having concave portions of a desired size and shape.

A third aspect of the invention is directed to a lens substrate. The lens substrate is manufactured using the above member with concave portions.

This makes it possible to provide a lens substrate having lens portions of a desired size and shape.

It is preferable that the lens substrate is a microlens substrate.

According to a conventional method, if a microlens substrate having a number of maicrolenses is manufactured, it is especially difficult to manufacture the microlens substrate having maicrolenses of a desired size and shape. In contrast, according to the manufacturing method, it is possible to provide a microlens substrate having microlenses of a desired size and shape. Therefore the resultant microlens substrate exhibits greatly improved viewing angle characteristics. In other words, when the lens substrate is adapted to the microlens substrate, the above-noted advantageous effects becomes more conspicuously.

A fourth aspect of the invention is directed to a transmission screen. The transmission screen is provided with the above microlens substrate.

This makes it possible to provide a transmission screen having excellent optical characteristics and reliability.

A fifth aspect of the invention is directed to a rear projection. The rear projection is provided with the above transmission screen.

This makes it possible to provide a rear projection having excellent optical characteristics and reliability.

DESCRIPTION OF EXEMPLARY EMBODIMENTS

Hereinafter, a method of manufacturing a member with concave portions, a member with concave portions, a lens substrate, a transmission type screen and a rear projection in accordance with the present invention will be described in detail based on preferred embodiments shown in the accompanying drawings.

In the present invention, the term "substrate" refers to a concept that encompasses substantially inflexible, relatively thick, large-sized articles, sheet-shaped articles, film-shaped articles and other like articles.

Although the lens substrate of the present invention is not particularly limited in its use or application, the following description will be focused on an instance that the lens substrate is principally used as a member for fabricating a transmission type screen and a rear projection.

Moreover, in the following description, a microlens substrate will be representatively described as one example of the lens substrate. In addition, although the member with concave portions of the present invention is not subject to any particular limitation in its use or application, an instance that the member with concave portions is used as a mold for manufacturing the lens substrate will be representatively set forth in the following description.

Furthermore, although the member with concave portions has a multiplicity of concave portions in reality and the microlens substrate has a multiplicity of microlenses (convex lenses) in practice, the drawings illustrate only a part of them in a highlighted manner for the sake of better understanding.

Member with Concave Portions and Method of Manufacturing the Same

Hereinafter, description will be given to a member with concave portions and a method of manufacturing the same in accordance with the present invention.

First Embodiment

First of all, description will be made on a member with concave portions and a method of manufacturing the same according to a first embodiment.

Figure 1:
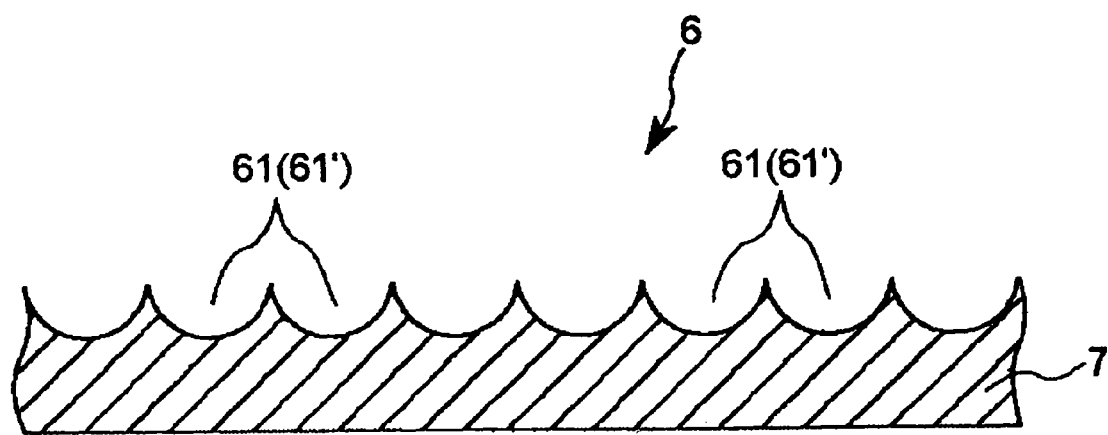
FIG. 1 is a vertical section view schematically showing a member with concave portions in accordance with the present invention.
Figure 2:
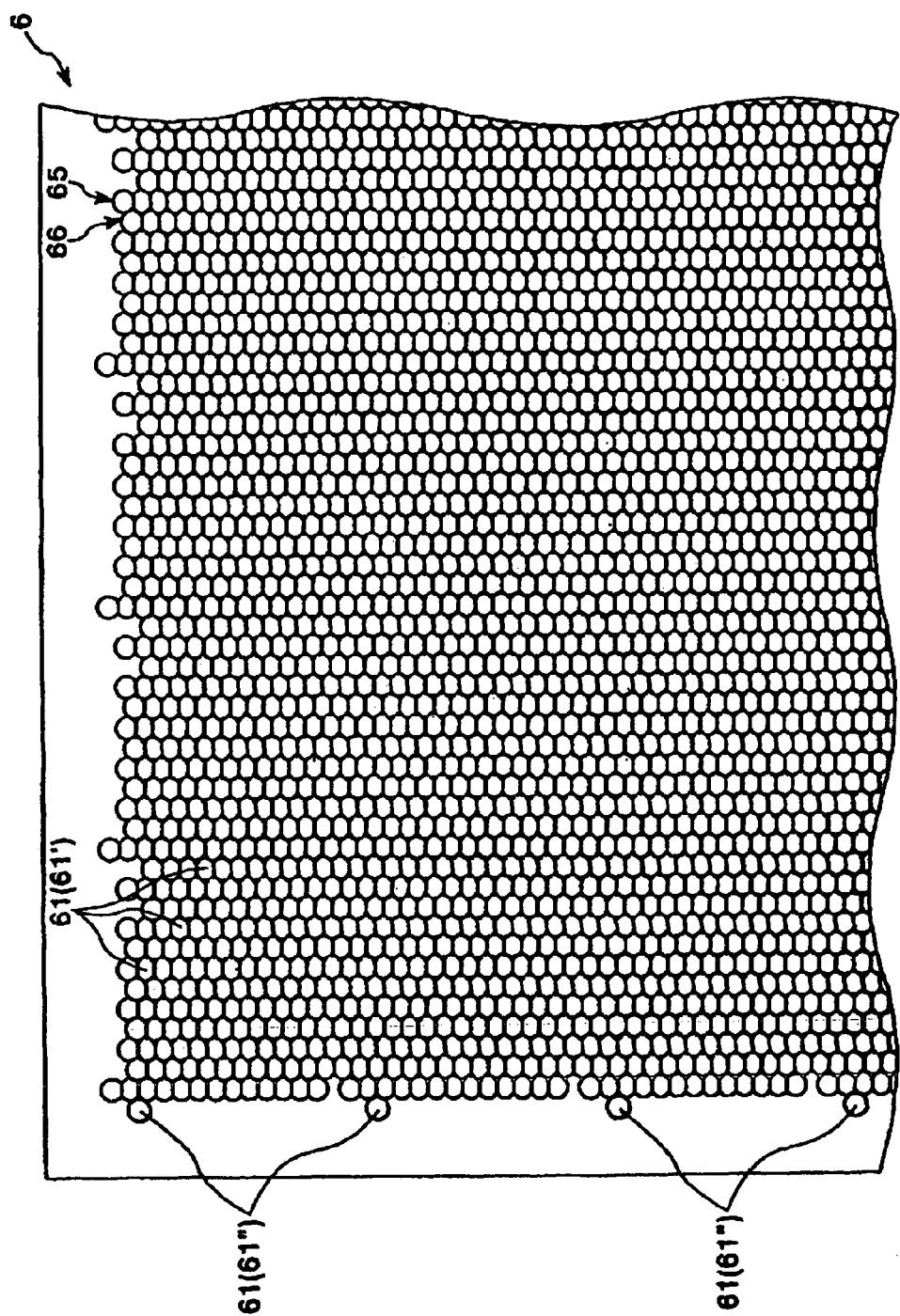
FIG. 2 is a plan view schematically showing a member with concave portions according to a first embodiment of the present invention.

FIG. 1 is a vertical section view schematically showing a member with concave portions in accordance with the present invention. FIG. 2 is a plan view schematically showing a member with concave portions according to a first embodiment of the present invention. FIG. 3 is a schematic vertical section view illustrating steps of manufacturing the member with concave portions in accordance with the present invention.

Figure 4:
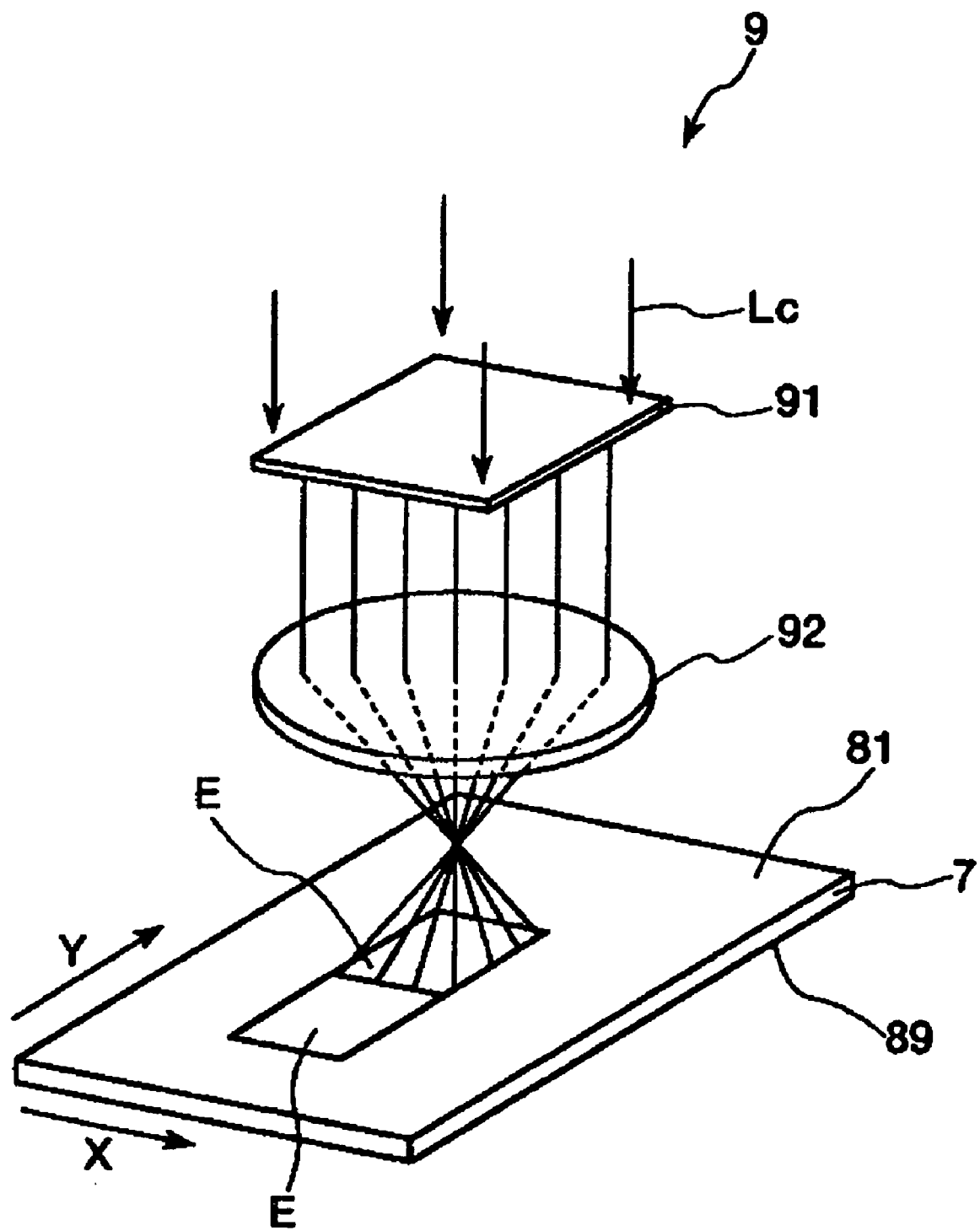
FIG. 4 is a view schematically showing a configuration of a laser processing apparatus used in forming openings and a situation that a laser irradiation treatment is being performed.
Figure 5:
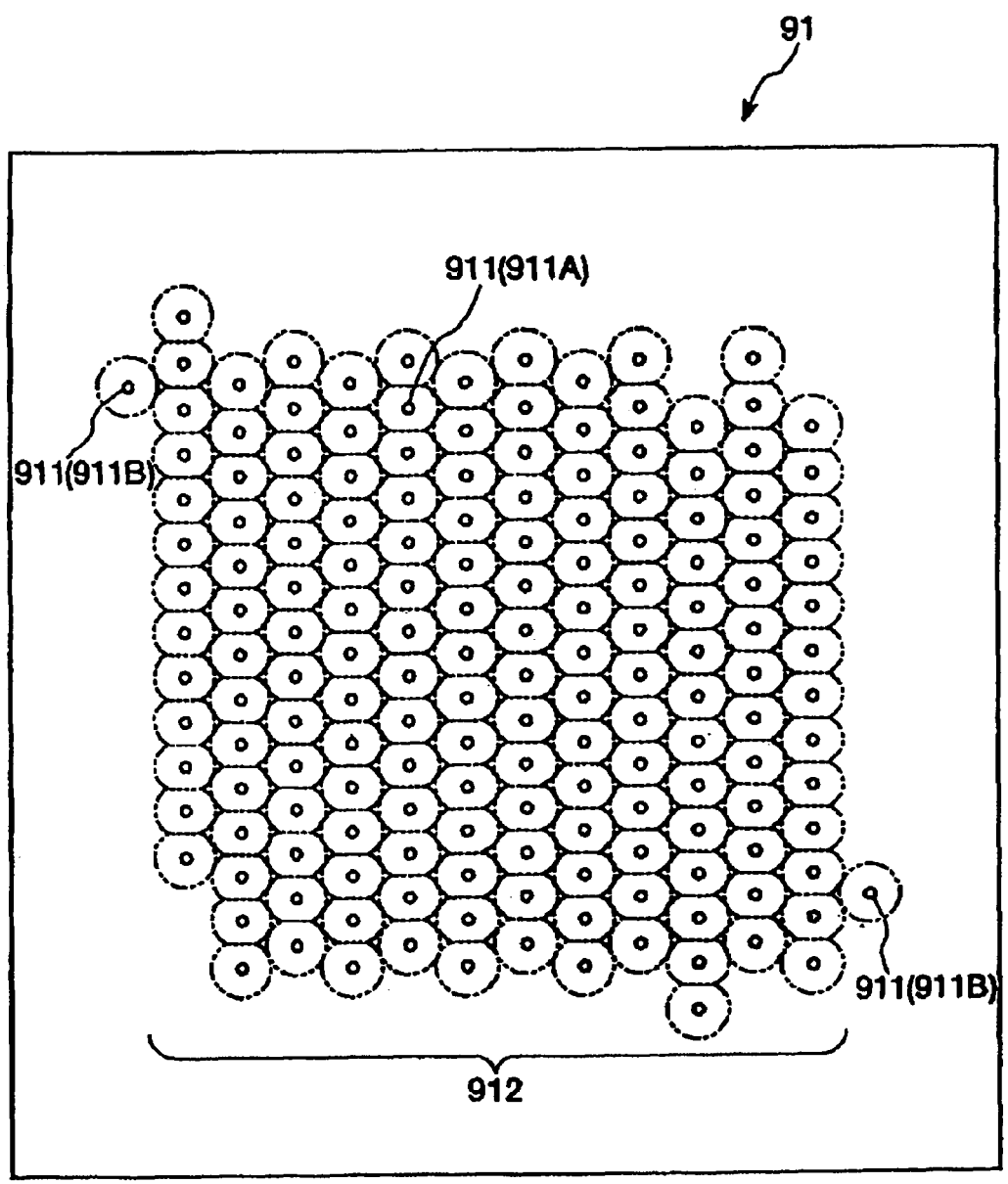
FIG. 5 is a plan view schematically showing a branching filter used in an opening forming step (a laser irradiation treatment) in a method of manufacturing a member with concave portions in accordance with a first embodiment.

FIG. 4 is a view schematically showing a configuration of a laser processing apparatus used in forming openings and a situation that a laser irradiation treatment is being performed. FIG. 5 is a plan view schematically showing a branching filter used in an opening forming step (a laser irradiation treatment) in a method of manufacturing a member with concave portions in accordance with a first embodiment.

Figure 6:
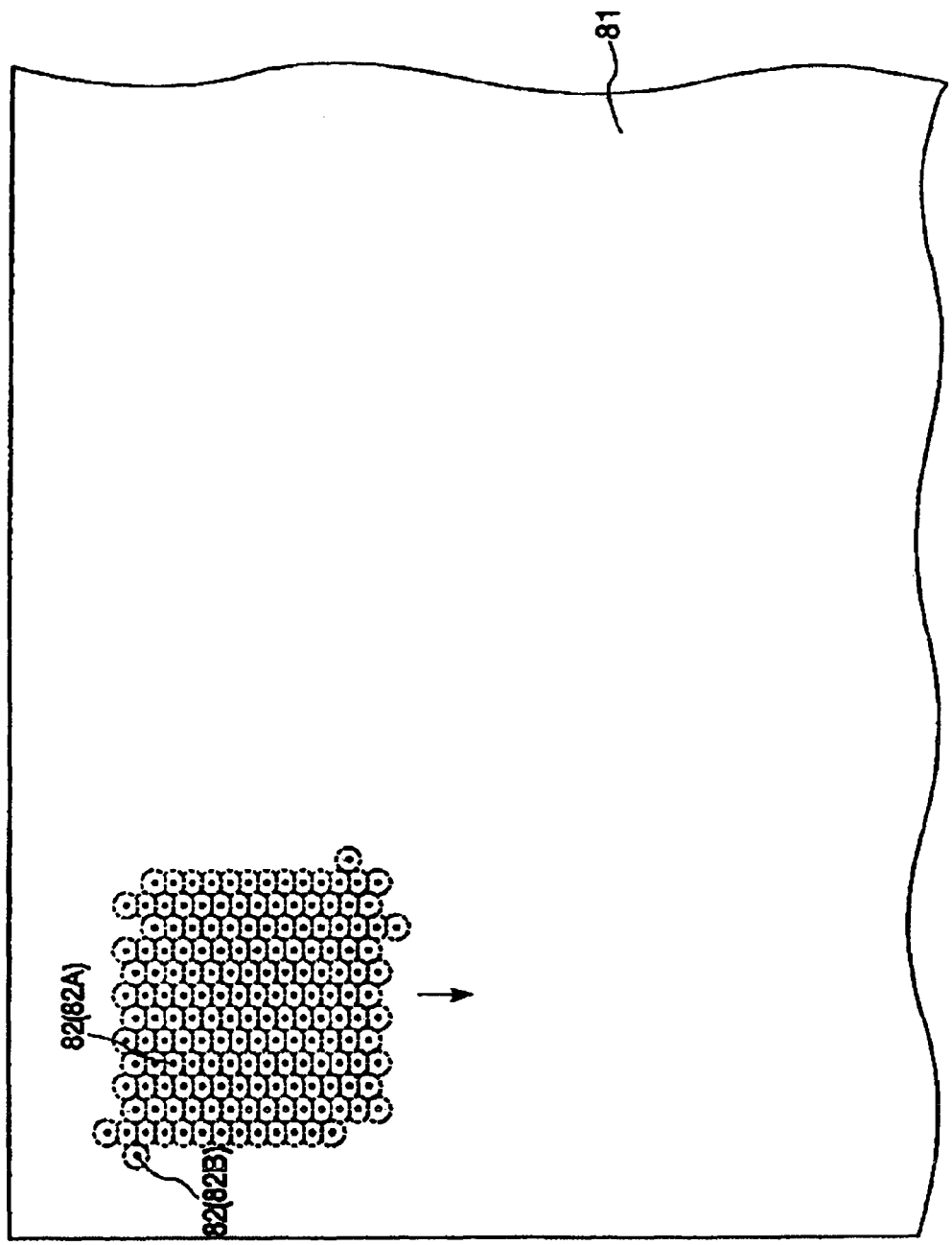
FIG. 6 is a plan view illustrating an arrangement of openings formed in a mask formation film each time a laser irradiation treatment is carried out in the method of manufacturing a member with concave portions in accordance with the first embodiment.
Figure 7:
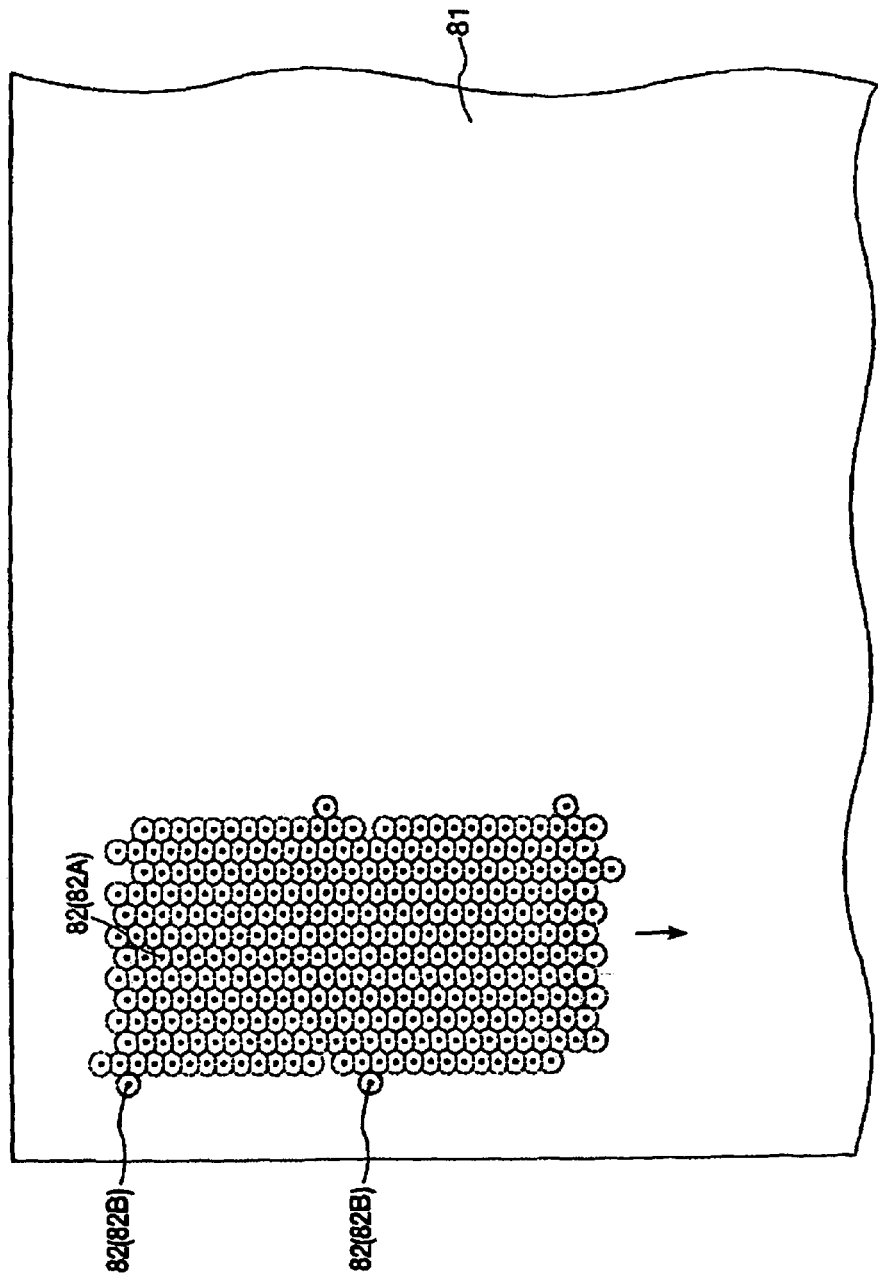
FIG. 7 is a plan view illustrating different situations that openings are sequentially formed on a group-by-group basis in the mask formation film by repeatedly performing the laser irradiation treatment.
Figure 8:
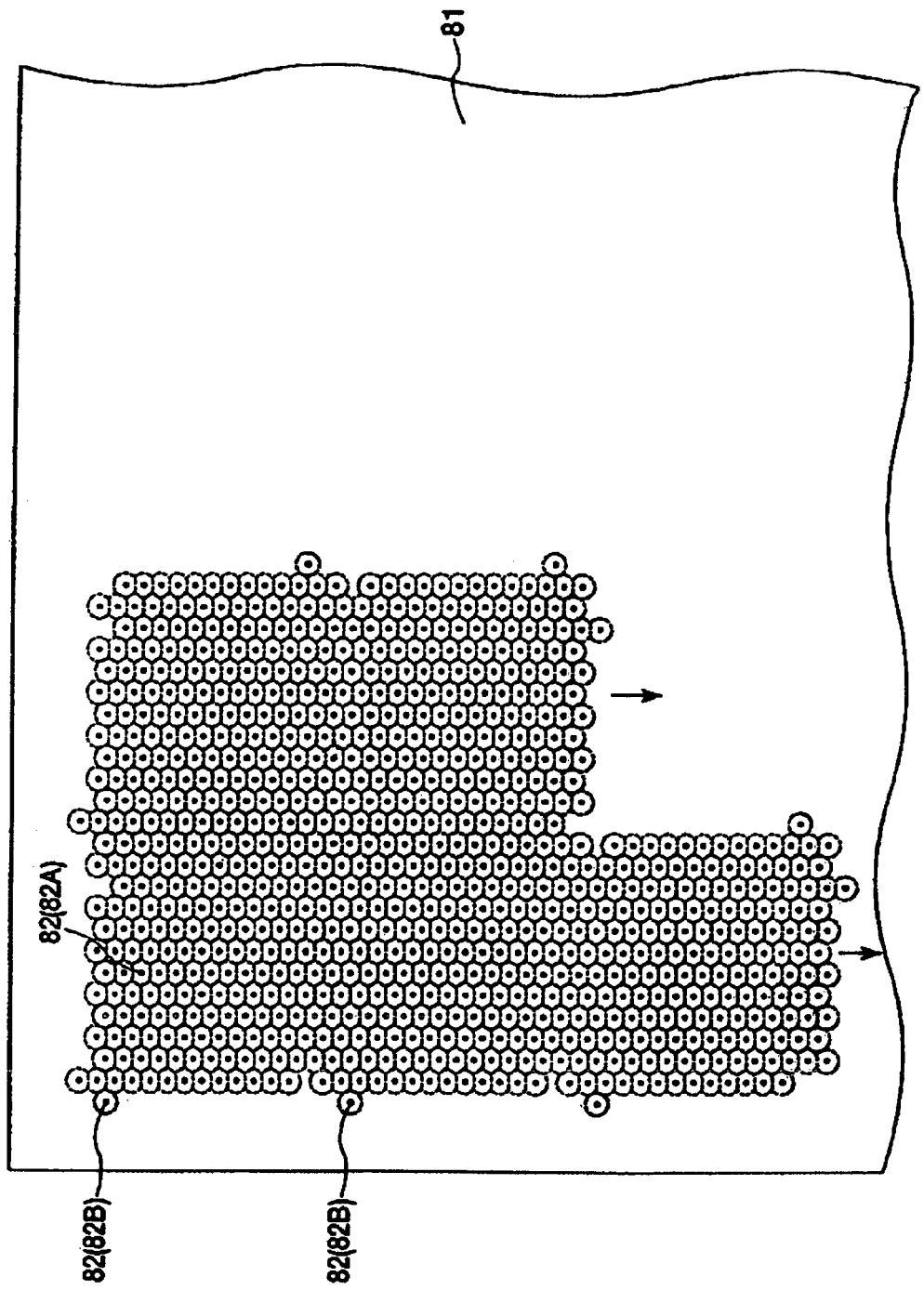
FIG. 8 is a plan view illustrating different situations that openings are sequentially formed on a group-by-group basis in the mask formation film by repeatedly performing the laser irradiation treatment.

FIG. 6 is a plan view illustrating an arrangement of openings formed in a mask formation film each time a laser irradiation treatment is carried out in the method of manufacturing a member with concave portions in accordance with the first embodiment. FIGS. 7 and 8 are plan views illustrating different situations that openings are sequentially formed on a group-by-group basis in the mask formation film by repeatedly performing the laser irradiation treatment.

In the following description, the upper side in FIG. 3 will be referred to as "top" or "upper" and the lower side will be referred to as "bottom" or "lower", only for the sake of clarity. Further, in FIGS. 5 to 8, the concave portions 61 formed on corresponding locations of a substrate 7 are illustrated by phantom lines, which holds true in FIGS. 10 to 13 and 15 to 18 described later.

Moreover, in the following description, the longitudinal direction (vertical direction) in the case where a microlens substrate is applied to a rear projection will be simply referred to as "longitudinal direction" or "vertical direction", whereas the transverse direction (horizontal direction) in the case where the microlens substrate is applied to the rear projection will be simply referred to as "transverse direction" or "horizontal direction". This also holds true for the member with concave portions that corresponds to the microlens substrate.

First, description will be given to a member with concave portions in accordance with the invention, before a method of manufacturing the member with concave portions in accordance with the invention.

The member with concave portions 6 is manufactured by a method described later. As shown in FIGS. 1 and 2, the member with concave portions 6 has a number of concave portions 61 (concave portions 61' and concave portions 61") on the surface thereof.

The member with concave portions (substrate with concave portions) 6 may be constituted from any kind of material but is preferably made of a material which is difficult to generate flection and flaws. Examples of a constituent material of the member with concave portions 6 include various kinds of glass materials, various kinds of resin materials and the like.

Examples of glass material include soda-lime glass, crystalline glass, quartz glass, lead glass, potassium glass, borosilicate glass, alkali-free glass and the like.

Examples of resin material include polyolefins such as polyethylene, polypropylene, ethylene-propylene copolymer, ethylene-vinyl acetate copolymer (EVA) and the like, cyclic polyolefin, denatured polyolefin, polyvinyl chloride, polyvinylidene chloride, polystyrene, polyamide (such as nylon 6, nylon 46, nylon 66, nylon 610, nylon 612, nylon 11, nylon 12, nylon 6-12, nylon 6-66), polyimide, polyamide-imide, polycarbonate (PC), poly-(4-methylpentene-1), ionomer, acrylic resin, acrylonitrile-butadiene-styrene copolymer (ABS resin), acrylonitrile-styrene copolymer (AS resin), butadiene-styrene copolymer, polyoxymethylene, polyvinyl alcohol (PVA), ethylene-vinyl alcohol copolymer (EVOH), polyesters such as polyethylene terephthalate (PET), polybutylene terephthalate (PBT), and polycyclohexane terephthalate (PCT), polyether, polyether ketone (PEK), polyether ether ketone (PEEK), polyether imide, polyacetal (POM), polyphenylene oxide, denatured polyphenylene oxide, polysulfone, polyether sulfone, polyphenylene sulfide, polyarylate, liquid crystal polymer such as aromatic polyester, fluoro resins such as polytetrafluoroethylene (PTFE), polyfluorovinylidene and the like, various thermoplastic elastomers such as styrene based elastomer, polyolefin based elastomer, polyvinylchloride based elastomer, polyurethane based elastomer, polyester based elastomer, polyamide based elastomer, polybutadiene based elastomer, trans-polyisoprene based elastomer, fluorocarbon rubber based elastomer, chlorinated polyethylene based elastomer and the like, epoxy resins, phenolic resins, urea resins, melamine resins, unsaturated polyester, silicone based resins, urethane based resins, and the like; and copolymers, blended bodies and polymer alloys and the like having at least one of these materials as a main ingredient. Further, in this invention, a mixture of two or more kinds of these materials may be utilized.

Among these materials, as the constituent material of the member with concave portions 6, glass material is preferable, and soda-lime glass, crystalline glass (for example, neoceram or the like) or alkali-free glass is more preferable. The member with concave portions 6 manufactured from such materials has an excellent shape stability. Therefore, the concave portions 61 formed in the member with concave portions 6 also have an excellent shape stability (reliability). As a result, microlenses 21 formed using the member concave portions 6 having concave portions 61 (concave portions 61') have exceptional dimensional accuracy. This makes it possible to remarkably improve the optical characteristics of the lens substrate.

Further, when soda-lime glass, crystalline glass or alkali-free glass is used, it is easy to process the material for the member with concave portions 6, and it is advantageous from the viewpoint of a manufacturing cost of the member with concave portions 6 because soda-lime glass, crystalline glass or alkali-free glass is relatively inexpensive.

The member with concave portions (substrate with concave portions) 6 is provided with a plurality of concave portions 61' (concave portions for formation of microlenses) arranged in a one-to-one correspondence to (in a complementary positional relationship with) microlenses 21 of a below-mentioned microlens substrate (lens substrate) 1.

The concave portions 61' correspond in shape and size to the microlenses 21, except that they have a concavity as opposed to a convexity of the microlenses 21. Namely, the concave portions 61' have a similar but complementary shape with respect to the microlens 21.

In the present embodiment, the concave portions 61' have a flattened shape (generally elliptical shape or generally rectangular round shape) with a longitudinal (vertical) width being smaller than a transverse (horizontal) width when the member with concave portions 6 is seen in a plan view.

The concave portions 61' of such a shape makes sure that the microlens substrate 1 obtained exhibits greatly improved viewing angle characteristics. In particular, the viewing angle characteristics become excellent both in the horizontal direction and in the vertical direction. Moreover, the brightness of a projected image grows higher.

Assuming that, when seen in a plan view, the minor axis direction (longitudinal) length of each concave portion 61' is $L_1$ (μm) and the major axis direction (transverse) length of each concave portion 61' is $L_2$ (μm), it is preferable to satisfy the relationship $0.10 \leq L_1/L_2 \leq 0.99$, more preferable to satisfy the relationship $0.50 \leq L_1/L_2 \leq 0.95$, and even more preferable to satisfy the relationship $0.60 \leq L_1/L_2 \leq 0.80$. Satisfaction of these relationships makes the above-identified advantageous effects more conspicuously.

The minor axis direction length of each concave portion 61' (the longitudinal width of each concave portion 61') when seen in a plan view is preferably 10-500 μm, more preferably 30-300 μm, and even more preferably 50-100 μm. If the minor axis direction length of each concave portion 61' falls within the above ranges, it becomes possible to achieve a high enough resolution in an image projected to a screen, while effectively preventing generation of drawbacks, such as a moire and the like, which would otherwise appear in the microlens substrate 1 manufactured using the member with concave portions 6. It is also possible to further increase the productivity of the microlens substrate 1 (the transmission type screen 10).

Furthermore, the major axis direction length of each concave portion 61' (the transverse width of each concave portion 61') when seen in a plan view is preferably 15-750 μm, more preferably 45-450 μm, and even more preferably 70-150 μm. If the major axis direction length of each concave portion 61' falls within the above ranges, it is possible to achieve a high enough resolution in an image projected to a screen, while effectively preventing generation of drawbacks, such as a moire and the like, which would otherwise appear in the microlens substrate 1 manufactured using the member with concave portions 6. It is also possible to increase the productivity of the microlens substrate 1 (the transmission type screen 10).

Moreover, the radius of curvature of each concave portion 61' is preferably 7.5-375 μm, more preferably 22.5-225 μm, and even more preferably 35-75 μm. If the radius of curvature of each concave portion 61' falls within the above ranges, the microlens substrate 1 manufactured using the member with concave portions 6 shows greatly improved viewing angle characteristics.

More importantly, the viewing angle characteristics are improved both in the horizontal direction and in the vertical direction. The radii of curvature of each concave portion 61' in the minor axis direction and in the major axis direction may differ from each other, in which case it is preferred that the radius of curvature in the major axis direction falls within the above ranges.

In addition, the depth of each concave portion 61' is preferably 7.5-375 µm, more preferably 22.5-225 µm, and even more preferably 35-75 µm. If the depth of each concave portion 61' falls within the above ranges, the microlens substrate 1 manufactured using the member with concave portions 6 becomes exceptionally good in the light use efficiency and the viewing angle characteristics.

The plurality of concave portions 61' are arranged in a staggering pattern (in a houndstooth check pattern). Arranging the concave portions 61' in this manner makes it possible to effectively prevent generation of drawbacks, such as a moire and the like, which would otherwise appear in the transmission type screen 10 (the rear projection 300) finally obtained.

In contrast, if the concave portions 61' would be arranged, e.g., in a square lattice pattern or other like patterns, it may be sometimes difficult to reliably prevent generation of drawbacks, such as a moire and the like, depending on the size or the like of the concave portions 61'.

In the case where the concave portions 61' would be arranged in a random pattern, it may be difficult to sufficiently increase the occupying ratio of the concave portions 61' in an effective area in which the concave portions 61' are formed in a regularly arranged manner, depending on the size or the like of the concave portions 61'.

In this case, it may also be difficult to sufficiently increase the light transmittance (the light use efficiency) of the microlens substrate 1 obtained, which may result in a darkened image.

As described above, in the present embodiment, the concave portions 61' are arranged in a houndstooth check pattern when the member with concave portions 6 is seen in a plan view. It is, however, preferred that first rows 65 of concave portions 61' are staggered in the longitudinal direction by one half pitch from second neighboring rows 66 of concave portions 61'.

This makes it possible to more effectively prevent generation of a moire and other drawbacks, which would otherwise appear by light interference in the transmission type screen 10 (the rear projection 300) finally obtained. This also enables the transmission type screen 10 (the rear projection 300) to exhibit greatly improved viewing angle characteristics.

By strictly defining the shape, arrangement pattern, occupying ratio and the like of the concave portions 61' as set forth above, it is possible to effectively prevent generation of a moire and other drawbacks, which would otherwise appear by light interference in the transmission type screen 10 (the rear projection 300) finally obtained. It is also possible to ensure that the transmission type screen 10 (the rear projection 300) exhibits greatly improved viewing angle characteristics.

Furthermore, when the member with concave portions 6 is seen in a plan view, the occupying ratio of the concave portions 61' in the effective area in which the concave portions 61' are formed is preferably 90% or more, more preferably 96% or more, and even more preferably 97% or more. If the occupying ratio of the concave portions 61' falls within the above ranges, it becomes possible to further improve the light use efficiency of the microlens substrate 1 obtained and also to make the brightness and contrast of a projected image exceptionally good.

The arrangement pattern of the concave portions 61' is not limited to the afore-mentioned one but may be, e.g., a square lattice pattern.

In the case where a base substrate 2 constituting the microlens substrate 1 targeted for manufacture is composed of, e.g., a shrinkable material (namely, in the case where the composition constituting the base substrate 2 tends to be shrunk by solidification and so forth), the microlenses 21 and the concave portions 61' may be designed to have different shapes (size) and occupying ratios from each other in consideration of their shrinkage factors.

Concave portions 61" (for examination use) are provided outside the effective area in which the concave portions 61' (for formation of the microlenses) are formed. As will be described later in detail, the concave portions 61" are used to determine the degree of progress of etching in an etching step set forth below. Further, as described later, concave portions 61" (for examination use) are formed using some of the openings 82B formed by the laser beams (second laser beams) transmitted through the second light transmission portions 911B used in the laser irradiation treatments for the specified irradiation regions E.

When seen in a plan view, the concave portions 61" are of a generally circular shape in usual cases. And, the concave portions 61" usually have a diameter substantially equal to the major axis direction length of the concave portions 61'.

Next, description will be given to a method of manufacturing a member with concave portions in accordance with the present embodiment. In manufacturing the member with concave portions 6, a base plate (base material) 7 is prepared first. It is preferred that the base plate 7 has a uniform thickness and is free from deflection or flaws.

It is also preferred that surfaces of the base plate 7 are purified by cleaning or other means. Such a purification can be conducted by, e.g., etching (lightly etching) the surfaces of the base plate 7. The etching method is not particularly limited and may be, e.g., wet etching, dry etching or the like.

In the case of the wet etching, it is preferred to use, as an etching solution, a mixture of ammonium monohydrogen difluoride and sulfuric acid, although not particularly limited thereto. This makes it possible to increase the smoothness of the surfaces of the base plate 7, while readily dislodging impurities, such as Na, K and the like, from the surfaces of the base plate 7.

As a result, in the below-mentioned mask formation step, it is possible to diminish defects, such as a pinhole and the like, which would possibly appear in a mask formation film 81 (a mask 8). Thus, in an etching step set forth later, it becomes possible to reliably prevent the portions of the base plate 7 other than the portions corresponding to openings of the mask formation film 81 from being etched unintentionally.

Subsequently, in the following manner, a mask 8 having a multiplicity of openings (initial openings) 82 is formed on a front surface of the base plate 7 thus prepared, and a rear surface protection film 89 is formed on a rear surface of the base plate 7 (a surface opposite from the surface on which the mask 8 is formed).

Step A1

Figure 3A:
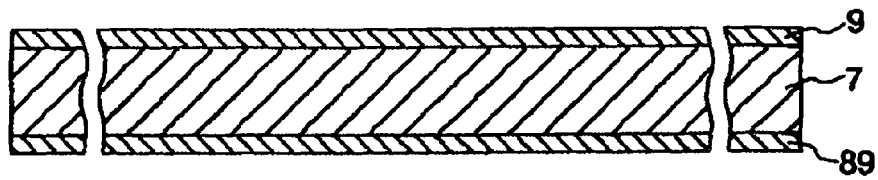
FIG. 3 is a schematic vertical section view illustrating steps of manufacturing the member with concave portions in accordance with the present invention.

As illustrated in FIG. 3A, the rear surface protection film 89 is first formed on the rear surface of the base plate 7 thus prepared, and the mask formation film 81 is formed on the front surface of the base plate 7, which step will be referred to as "mask formation film forming step". The rear surface protection film 89 may be formed together with the mask formation film 81 in this step as illustrated in the drawings or may be formed in subsequent steps.

It is preferred that the mask formation film 81 allows the openings 82 (openings 82A and 82B) to be formed by irradiation of laser beams (laser processing) in the below-mentioned opening forming step but has a resistance against etching conducted in the below-noted etching step. In other words, it is preferred that the mask formation film 81 (the mask 8) has an etching rate smaller than that of the base plate 7.

From this point of view, examples of a constituent material of the mask formation film 81 (the mask 8) include metals such as Cr, Au, Ni, Ti and Pt, alloys containing two or more kinds of metals selected from them, oxides of the above-listed metals (metal oxides), silicon and resins. Furthermore, the mask formation film 81 (the mask 8) may be a single layer of substantially homogeneous composition or may be a laminated body having a plurality of different layers.

The mask formation film 81 (the mask 8) is preferably a laminated body having a layer consisting mainly of chromium and a layer consisting mainly of chromium oxide, although not particularly limited thereto. The mask formation film 81 of this construction ensures that openings of a desired shape can be formed easily and reliably by irradiation of laser beams (laser processing), which will be described later. Moreover, the mask 8 obtained from the mask formation film 81 of this construction exhibits enhanced stability against etching solution of various compositions, thereby making it possible to more reliably protect the base plate 7 in the below-mentioned etching step.

Further, the mask formation film 81 (the mask 8) of the above-noted construction makes it possible to reduce the thickness of the mask 8 while preserving a resistance against the etching solution. Moreover, the mask formation film 81 (the mask 8) of the above-noted construction allows liquid containing ammonium monohydrogen difluoride to be suitably used as the etching solution in the below-mentioned etching step. Ammonium monohydrogen difluoride is not a poisonous material, meaning that it is possible to reliably prevent any adverse effect on a human body at work or an environment.

In addition, the mask formation film 81 (the mask 8) of the above-noted construction is able to efficiently relieve an internal stress of the mask 8 and is exceptionally good in adhesion to the base plate 7 (especially, adhesion in an etching step). For the reasons stated above, use of the mask formation film 81 (the mask 8) of the above-noted construction makes it possible to suitably form the concave portions 61 into a desired shape.

In the case where the mask 8 is a laminated body having a layer consisting mainly of chromium and a layer consisting mainly of chromium oxide, it is preferable to satisfy the relationship $0.01 \leq Y/X \leq 0.8$ and more preferable to satisfy the relationship $0.1 \leq Y/X \leq 0.5$, where the X denotes an average thickness (nm) of the chromium layer and the Y stands for an average thickness (nm) of the chromium oxide layer. By satisfying these relationships, it is possible to form the openings 82 of a desired size with increased accuracy.

Although the method of forming the mask formation film 81 is not particularly limited, the mask formation film 81 may be suitably formed by, e.g., a vapor deposition method or a sputtering method, in the case where the mask formation film 81 (the mask 8) is made of metallic materials such as chromium (Cr) and gold (Au), alloys thereof, metal oxides (e.g., chromium oxide), or composites of these materials (e.g., a laminated body having a metal layer consisting of a metallic material and a metal oxide layer consisting of a metal oxide). Further, the mask formation film 81 may be suitably formed by, e.g., a sputtering method or a CVD method, in the case where the mask formation film 81 (the mask 8) is made of silicon.

The thickness of the mask formation film 81 (the mask 8) varies with the kinds of materials of which the mask formation film 81 (the mask 8) is composed, and is preferably 0.01-2.0 µm and more preferably 0.01-0.3 µm. This makes it possible to easily form the openings 82 with improved controllability of the size and shape thereof, while maintaining a resistance against etching.

If the thickness is smaller than the lower limit values, there is a possibility that, depending on the kinds of constituent materials of the mask formation film 81, the openings 82 formed in the below-mentioned opening forming step (initial hole forming step) may be distorted in shape. Also, there is a possibility that the masked portions of the base plate 7 cannot be sufficiently protected when wet etching is performed in the below-mentioned etching step.

On the other hand, if the thickness exceeds the upper limit values, it may be sometimes the case that, depending on the kinds of constituent materials of the mask formation film 81, the openings 82 penetrating the mask formation film 81 are difficult to form in the below-mentioned opening forming step and the mask formation film 81 (the mask 8) is apt to be peeled off by an internal stress developed therein.

The rear surface protection film 89 serves to protect the rear surface of the base plate 7 in the next and subsequent steps. By means of the rear surface protection film 89, the base plate 7 is properly protected from erosion, degradation or the like. The rear surface protection film 89 has the same construction as that of the mask formation film 81 (the mask 8), for instance. This means that the rear surface protection film 89 can be formed simultaneously with formation of the mask formation film 81 and in the same manner as the mask formation film 81.

Step A2

Figure 3B:
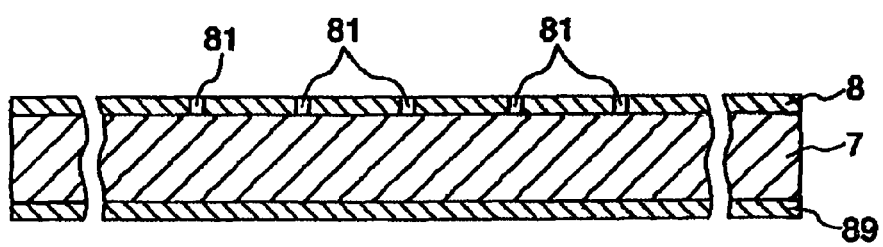

Next, as illustrated in FIG. 3B, the mask 8 is obtained by forming the openings 82 (openings 82A and 82B) in the mask formation film 81, which step will be referred to as "opening forming step". The openings 82 formed in this step serve as mask apertures in the below-mentioned etching process.

The openings 82 are formed by laser processing (laser beam irradiation). The laser processing makes it possible to easily and precisely form the openings 82 into a desired shape and arrangement pattern. As a result, the shape and arrangement pattern of the concave portions 61 can be controlled in a more reliable manner. Further, use of the laser processing in forming the openings 82 enables the member with concave portions 6 to be manufactured with improved productivity. More importantly, it is possible to simply form the concave portions 61 even in the base plate 7 having a large surface area.

Moreover, if the openings 82 are formed by the laser processing, not only is it possible to form the openings 82 alone with no formation of below-mentioned initial concave portions but also it is possible to easily and reliably form both the openings 82 and the initial concave portions with a reduced variation in shape, size and depth, by controlling laser irradiation conditions.

Examples of a laser usable in forming the openings 82 include a ruby laser, a semiconductor laser, a YAG laser, a femtosecond laser, a glass laser, an $YVO_4$ laser, a Ne—He laser, an Ar laser, a $CO_2$ laser and an excimer laser. It may be possible to use such wavelengths of these lasers as SHG, THG, FHG and the like.

The laser processing is performed by carrying out a laser irradiation treatment by which laser beams branched by a branching filter 91 are irradiated on an irradiation region of a predetermined area (size) of the mask formation film 81.

Specifically, in the present embodiment, the openings 82 are formed using a laser processing apparatus 9 as shown in FIG. 4. The laser processing apparatus 9 includes a laser light source (not shown), a branching filter 91 and a lens 92.

The branching filter 91 is a sheet-like member made of a light shielding material and has a plurality of (a multiplicity of) light transmission portions (holes) 911 arranged in a predetermined pattern for branching a laser light.

In the laser processing apparatus 9, the laser light Lc emitted from the laser light source are branched into a plurality of laser beams by the branching filter 91, which laser beams are reversed by the lens 92 and then irradiated on an irradiation region E of a predetermined area of the mask formation film 81. This treatment will be referred to as "laser irradiation treatment".

Thus, a multiplicity of openings 82 are formed in the irradiation region E of the mask formation film 81 with a predetermined magnification ratio and in an arrangement pattern corresponding to that of the holes formed in the branching filter 91. In this laser irradiation treatment, for instance, the area of the irradiation region E is decreased to about one of fifths of the surface area of the branching filter 91.

Such a laser irradiation treatment is sequentially carried out for a plurality of different irradiation regions E by relatively moving the base plate 7 to the laser light source and the branching filter 91 in an X-direction and in a Y-direction orthogonal to the X-direction, where the X-direction and the Y-direction refer to directions extending in parallel with the surface of the mask formation film 81.

Thus, openings 82A can be formed on the entire regions of the mask formation film 81 corresponding to the regions of the base plate 7 in which the concave portions 61' are to be formed. By performing the laser irradiation treatment for the plurality of different irradiation regions E, i.e., by carrying out the laser irradiation treatment several times, it is possible to control a variation in size and shape of the multiplicity of openings 82 formed in the mask 8.

This in turn makes it possible to control a variation in size and shape of the multiplicity of concave portions 61 of the member with concave portions 6 which will be formed by use of the mask 8. As a consequence, it is possible to remarkably improve optical characteristics and reliability of a microlens substrate 1 finally obtained.

Furthermore, by carrying out the laser irradiation treatment several times, it is possible to manufacture the member with concave portions 6 that has the concave portions 61 formed over a broad enough area, even through each of the irradiation regions E has a small area. That is to say, the member with concave portions 6 can be suitably manufactured into a big size. This also makes it possible to properly cope with the probable increase in size of a screen in the future with minimized equipment investment.

Moreover, by carrying out the laser irradiation treatment several times, it is possible to reduce the area of a region in the mask formation film 81, in which the openings 82 are formed by one time of laser irradiation. Thus, the variation in intensity of the laser beams in the respective regions of the irradiation region E can be suppressed, as compared to a case that the laser beams are irradiated on a broad area through a single time of irradiation.

Even in a hypothetical case that the laser beams irradiated would show a relatively great variation in irradiation intensity in the respective regions of the irradiation region E, such a variation can be deemed to be trivial from the stand point of the mask formation film 81 as a whole. This means that the variation in size and shape of the openings 82 can be controlled in a more reliable manner, which makes it possible to prevent occurrence of irregularities in color, brightness and the like in the microlens substrate 1 finally obtained.

In the branching filter 91, the width (length) of a region in which the light transmission portions 911 are provided is preferably 0.5-10 mm and more preferably 1-5 mm. This makes the afore-mentioned advantageous effects more conspicuously, while remarkably improving the productivity of the member with concave portions 6 in an efficient manner.

Furthermore, if the width (length) of a region in which the light transmission portions 911 are provided is kept sufficiently small as set forth above, even when misalignment occurs in a position aligning process for execution of the respective laser irradiation treatments, it is possible to make less conspicuous the resultant misalignment in the arrangement of the concave portions 61 in the member with concave portions 6 and in the arrangement of the microlenses 21 in the microlens substrate 1, thereby more reliably preventing any adverse influence on the quality of an image projected.

Moreover, if the width (length) of a region in which the light transmission portions 911 are provided is kept sufficiently small as set forth above, even when a variation in size of the light transmission portions 911 grows relatively high, it is possible to make less conspicuous the resultant variations in size of the concave portions 61 of the member with concave portions 6 and in size of the microlenses 21 of the microlens substrate 1, thereby more reliably preventing any adverse influence on the quality of an image projected.

As described above, in the case where the branching filter 91 is of a relatively small size, the number of the light transmission portions 911 of the branching filter 91 becomes relatively small.

The number of the light transmission portions 911 of the branching filter 91 is preferably 5-2000 and more preferably 10-200. This makes the afore-mentioned advantageous effects more conspicuously, while remarkably improving the productivity of the member with concave portions 6 in an efficient manner.

Furthermore, if the number of the light transmission portions 911 of the branching filter 91 falls within the above ranges, even when misalignment occurs in a position aligning process for execution of the respective laser irradiation treatments, it is possible to make less conspicuous the resultant misalignment in the arrangement of the concave portions 61 in the member with concave portions 6 and in the arrangement of the microlenses 21 in the microlens substrate 1, thereby more reliably preventing any adverse influence on the quality of an image projected.

Moreover, if the number of the light transmission portions 911 of the branching filter 91 falls within the above ranges, even when a variation in size of the light transmission portions 911 grows relatively high, it is possible to make less conspicuous the resultant variations in size of the concave portions 61 of the member with concave portions 6 and in size of the microlenses 21 of the microlens substrate 1, thereby more reliably preventing any adverse influence on the quality of an image projected.

Referring to FIG. 5, the branching filter 91 employed includes a light transmission portion group 912 consisting of a multiplicity of first light transmission portions 911A, the light transmission portion group 912 being provided in a predetermined region, and second light transmission portions 911B provided in a region differing from that of the light transmission portion group 912.

In other words, the branching filter 91 includes, as the light transmission portions 911 thereof, the first light transmission portions 911A arranged in a predetermined region and the second light transmission portions 911B arranged out of the predetermined region. By using such a branching filter 91, first laser beams are produced by transmitting of the laser light Lc through the first light transmission portions 911A, and second laser beams are produced by transmitting of the laser light Lc through the second light transmission portions 911B.

Although the light transmission portions 911 are in the form of through-holes in the illustrated embodiment, they are not limited to this type but may be constructed from a light transmitting material, for example.

In addition, by carrying out the laser irradiation treatment several times as described above, a multiplicity of regularly arranged openings 82 (openings 82A) are formed by the first laser beams in a region of the mask formation film 81 corresponding to a region of the base plate 7 in which the concave portions 61' (the concave portions for formation of the microlenses) are to be formed. And, a number of openings 82 (openings 82B) are formed by the second laser beams in a region of the mask formation film 81 corresponding to a region of the base plate 7 in which the concave portions 61" (the concave portions for examination use) are to be formed (see FIGS. 6 to 8).

The openings 82B are formed in a region of the mask formation film 81 corresponding to a region of the base plate 7 in which the concave portions 61" (the concave portions for examination use) are to be formed, in such a manner as to ensure that, when the concave portions 61" (the concave portions for examination use) formed in alignment with the openings 82B by execution of the below-mentioned etching step have grown into a predetermined size (namely, when the diameter of the concave portions 61" has become equal to a design value of the maximum diameter of the concave portions 61' targeted for formation), the concave portions 61" are overlapped with the concave portions 61' (the concave portions for formation of the microlenses) formed in alignment with the neighboring openings 82A. Thus, a mask 8 that has the openings 82 corresponding to the concave portions 61 targeted for formation can be obtained.

Specifically, by forming the mask 8 (the openings 82) in the above-noted manner, it is possible, in the below-mentioned etching step, to form a multiplicity of regularly arranged concave portions 61 (concave portions 61') in an effective area of the base plate 7 with no loss. And it is also possible to form a multiplicity of concave portions 61" for examination use in an ineffective area of the base plate 7 which is positioned out of the effective area, the concave portions 61" for examination use being used in examining the shape of the concave portions 61 formed by etching.

As a result, in the etching step, the progress of etching for the base plate 7 can be properly determined by observing the appearance of the concave portions 61" for examination use, and it becomes possible to easily and reliably manufacture a member with concave portions 6 that has the concave portions 61 of a suitable size and shape.

Furthermore, the openings 82 (openings 82B) are formed in one or more of the subsequent laser irradiation treatments by use of the laser beams (second laser beams) transmitted through the second light transmission portions 911B, in the portions of the mask formation film 81 which lie within the region having the multiplicity of openings 82 (openings 82A) formed by the laser beams (first laser beams) transmitted through the first light transmission portions 911A but in which the openings 82 (openings 82A) have not yet been formed in a preceding laser irradiation treatment.

This allows the second light transmission portions 911B (the laser beams (second laser beams) transmitted through the second light transmission portions 911B) to be used as a datum when aligning the position of each of the irradiation regions E, whereby the openings 82 formed in the mask 8 can be kept free from misaligned formation, disarrayed arrangement and so forth.

Further, in each of the laser irradiation treatments on or after the second laser irradiation treatment, the openings 82A are formed by the laser beams (first laser beams) transmitted through the first light transmission portions 911A within the irradiation region E other than the openings 82B which have already been formed by the laser beams (second laser beams) transmitted through the second light transmission portions 911B in one or more of the preceding laser irradiation treatments.

Moreover, since the mask 8 is processed by carrying out the laser irradiation treatment several times, it is possible to control a variation in size and shape of the multiplicity of openings 82 formed in the mask 8.

As a consequence, it becomes possible to control a variation in size and shape of the concave portions 61' of the member with concave portions 6, which will be manufactured by use of the mask 8, and also to control a variation in size and shape of the microlenses 21 of the microlens substrate 1, which will be manufactured using the member with concave portions 6. This makes it possible to remarkably improve optical characteristics and reliability of the microlens substrate 1.

In contrast, if a branching filter having no second light transmission portion is used (if no concave portion for examination use is formed), it is difficult to properly determine the progress of etching in the below-mentioned etching step. Consequently, there is a difficulty in obtaining a lens substrate having lens portions of a desired size and shape, which makes it difficult to achieve a satisfactory level of optical characteristics.

It would be conceivable that openings are formed within an effective area by use of a branching filter having no second light transmission portion and, in addition, openings for examination use are separately formed in an ineffective area.

In this case, however, variations become greater in size and shape of the openings in the effective area and in size and shape of the openings (openings for examination use) in the ineffective area. This makes it difficult to properly control an etching operation in the etching step and to form concave portions of a desired size and shape.

Moreover, if a branching filter having no second light transmission portion is used, it is difficult to align the position of the respective irradiation regions when performing the laser irradiation treatment several times and it is also difficult to surely prevent misaligned formation or the like of the openings 82 formed in the mask.

It would also be conceivable to use a branching filter that corresponds to the whole surface of a mask targeted for formation, i.e., a branching filter that has light transmission portions corresponding in number and arrangement to the openings of a mask targeted for formation.

In this case, however, an increase is unavoidable in size of a branching filter used, a light source for irradiating a parallel light and a lens for reversing light beams transmitted through the branching filter, thereby sharply increasing the production costs of a member with concave portions.

Moreover, if use is made of a branching filter having a very large number of light transmission portions as noted above, distortion in shape caused by an aberration grows conspicuous, thus making it difficult to form the concave portions as designed.

In the present embodiment, as illustrated in FIG. 6, the openings 82 (openings 82A and 82B) are formed in such a manner that, in the ineffective area of the base plate 7, the concave portions 61" for examination use formed in the below-mentioned etching step can adjoin the concave portions 61'.

Furthermore, in the present embodiment, the second light transmission portions 911B of the branching filter 91 are provided in plural numbers, which means that the openings 82B are formed in plural numbers by one time of laser irradiation treatment.

Thus, when the openings 82 are formed by sequentially performing the laser irradiation treatments for different adjoining irradiation regions E, the task of aligning the position of the irradiation regions E can be conducted in a suitable manner. This makes it possible to more reliably prevent occurrence of unintentional misaligned formation of the openings 82 or other defects.

During the process of forming the openings 82 in the mask formation film 81, it may be possible to form initial concave portions by removing some parts of the front surface of the base plate 7 as well as the mask formation film 81. This ensures that, when etching is performed in the below-mentioned etching step, the initial concave portions make contact with etching solution in an increased contact area, thereby allowing erosion to be started with ease.

Furthermore, it is possible to adjust the depth of the concave portions 61' (the maximum thickness of the lenses) through adjustment of the depth of the initial concave portions. In the case of forming the initial concave portions, the depth thereof is preferably equal to or smaller than 5 µm and more preferably about 0.1-0.5 µm, although not particularly limited thereto.

Moreover, by forming the openings 82 through irradiation of the laser beams, it is possible to more reliably diminish a variation in depth of the plurality of initial concave portions formed together with the openings 82. This helps to reduce a variation in depth of the respective concave portions 61 of the member with concave portions 6, which in turn makes it possible to reduce a variation in size and shape of the microlenses 21 of the microlens substrate 1 finally obtained. As a result, it is possible to remarkably reduce a variation in diameter, focal length and lens thickness of each of the microlenses 21.

Although there is no limitation in size, the openings 82 formed in the present step has a generally circular shape with the diameter thereof being preferably 0.8-20 µm, more preferably 1.0-10 µm and even more preferably 1.5-4 µm. If the diameter of the openings 82 falls within the above ranges, the concave portions 61' having the above-noted shape can be reliably formed in the below-mentioned etching step.

Step A3

Figure 3C:
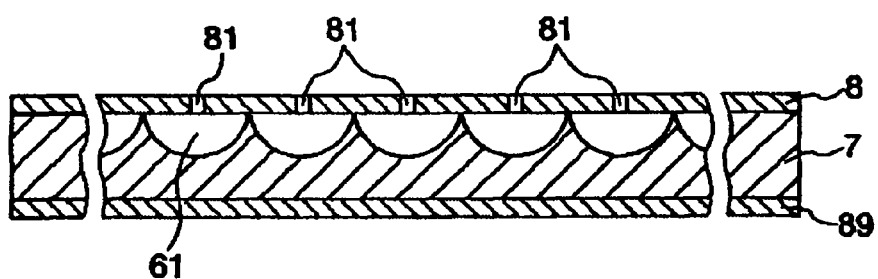

Next, the base plate 7 coated with the mask 8 having the openings 82 (openings 82A and 82B) formed in the preceding step is etched to form, as illustrated in FIG. 3C, a multiplicity of concave portions 61 (concave portions 61' and concave portions 61" for examination use) on the base plate 7, which step will be referred to as "etching step".

Although all kinds of etching solution may be used with no particularly limitation, it is preferred to use ammonium fluoride as the etching solution. Examples of ammonium fluoride include normal salt ($NH_4F$) and hydrogen salt ($NH_4HF_2$: ammonium monohydrogen difluoride), which may be used independently or in combination.

Particularly, in the case of using ammonium fluoride mainly composed of ammonium monohydrogen difluoride, it is possible to etch the base plate 7 in a more efficient manner. Ammonium monohydrogen difluoride solution is not a poisonous material and, therefore, it is possible to prevent any adverse effect on a human body while at work or an environment.

Although there is no particular limitation, the content of ammonium fluoride in the etching solution is preferably 1-500 g/L, more preferably 1-200 g/L and even more preferably 10-100 g/L. This makes it possible to etch the base plate 7 in a more efficient manner.

If, however, the content of ammonium fluoride is smaller than the lower limit values, there is a possibility that a high enough etching speed cannot be achieved depending on the etching conditions such as a temperature of the etching solution and the like. On the other hand, if the content of ammonium fluoride exceeds the upper limit values, it may not be possible to attain an advantageous effect commensurate with that content.

Furthermore, the etching solution may contain acid in addition to ammonium fluoride noted above. Any kind of acid may be used with no particular limitation as far as it does not produce $F^-$-ions, $HF_2^-$-ions or the like when dissolved in water. Examples of such acid include inorganic acid such as sulfuric acid, hydrochloric acid or nitric acid, and organic acid such as acetic acid or succinic acid, one or more of which may be used independently or in combination.

Among them, it is preferable to use inorganic acid, more preferable to use oxo acid such as sulfuric acid or nitric acid, and even more preferable to use sulfuric acid. This makes it possible to more effectively remove byproducts of reaction between the etching solution and a glass.

In particular, In the case where a laminated body having a layer consisting mainly of chromium and a layer consisting mainly of chromium oxide is used as the mask 8, use of an etching solution containing sulfuric acid ensures that the base plate 7 is more uniformly etched while effectively suppressing an adverse effect on the mask 8.

Although there is no particular limitation, the content of acid in the etching solution is preferably 1.7-920 g/L, more preferably 1.7-370 g/L and even more preferably 1.7-190 g/L. This makes it possible to more effectively remove byproducts of reaction between the etching solution and a glass.

If, however, the content of acid is smaller than the lower limit values, it may be sometimes the case that the above-noted advantageous effects are not sufficiently attained depending on the composition of the base plate 7, the content of ammonium fluoride and so forth. On the other hand, if the content of acid exceeds the upper limit values, it may be the case that the mask 8 suffers from unintentional adverse influence depending on the composition of the mask 8, the content of ammonium fluoride and so forth.

Assuming that the content of ammonium fluoride in the etching solution is A(g/L) with the content of acid being B(g/L), it is preferable to satisfy the relationship $1.0 \leq B/A \leq 4.0$, more preferable to satisfy the relationship $1.0 \leq B/A \leq 3.0$ and even more preferable to satisfy the relationship $1.3 \leq B/A \leq 2.7$. This makes it possible to etch the base plate 7 more uniformly and efficiently, while more effectively removing byproducts of reaction between the etching solution and a glass.

The etching solution may contain a solvent such as water or the like, in addition to ammonium fluoride and acid set forth above. Furthermore, in addition to the above-noted components, additives such as hydrogen peroxide, a surface acting agent and the like may be contained in the etching solution. Inclusion of such additives assures uniform etching for the base plate 7. Particularly, In the case where hydrogen peroxide is added among other components, it becomes possible to increase the etching speed.

Moreover, the above-noted advantageous effects becomes more conspicuously, if the above relationships are satisfied and if the afore-mentioned laminated body having a layer consisting mainly of chromium and a layer consisting mainly of chromium oxide is used as the mask.

As described above, the mask 8 is provided with the openings 82B (the openings corresponding to the second light transmission portions). Moreover, as set forth above, the openings 82B are formed in a region of the mask formation film 81 corresponding to a region of the base plate 7 in which the concave portions 61" (the concave portions for examination use) are to be formed, i.e. corresponding to a region of the base plate 7 other than the region in which the concave portions 61' (the concave portions for formation of the microlenses) are to be formed, in such a manner as to ensure that, when the concave portions 61" (the concave portions for examination use) has been formed on the base plate 7, the concave portions 61" are overlapped with the neighboring concave portions 61' (the concave portions for formation of the microlenses).

The concave portions 61" (the concave portions for examination use) has a generally circular shape when seen in a plan view, which makes it possible to measure the exact size thereof. Thus, in the present step, by observing the progress of etching for the concave portions 61" (the concave portions for examination use) corresponding to the openings 82B, it is possible to easily and accurately predict the size and shape of the concave portions 61' (the concave portions for formation of the microlenses) which are being formed in the portions corresponding to the openings 82A. This makes it possible to properly determine the end point of etching.

Consequently, it is possible to easily and reliably manufacture the member with concave portions 6 that has the concave portions 61' of a desired size and shape. Moreover, it is possible to reduce a variation in size and shape of the respective concave portions 61'.

The etching operation is terminated just when the concave portions 61" corresponding to the openings 82B have been formed into a predetermined size. This makes it possible to prevent the portions of the base plate 7 corresponding to the openings 82A from being excessively etched, thereby allowing the concave portions 61' (the concave portions for formation of the microlenses) to be accurately formed into a desired size and shape.

Step A4

Figure 3D:
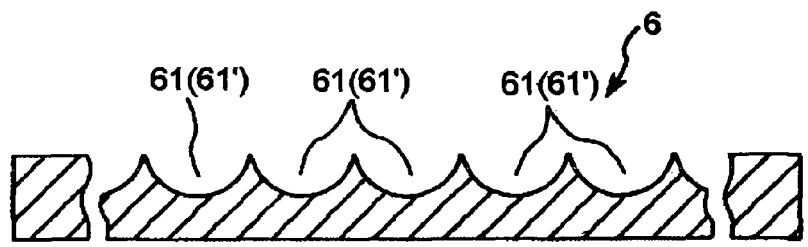

Finally, as illustrated in FIG. 3D, the mask 8 is removed form the base plate 7, which step will be referred to as "mask removing step". Concurrently with removal of the mask 8, the rear surface protection film 89 is also removed to thereby obtain the member with concave portions 6.

In the case where the mask 8 is formed of the afore-mentioned laminated body having a layer consisting mainly of chromium and a layer consisting mainly of chromium oxide, removal of the mask 8 can be suitably carried out through an etching operation using, e.g., a mixture of cerium(II) ammonium nitrate and perchloric acid.

In addition, for example, the surface of the member with concave portions 6 on which the concave portions 61 are formed may be subject to a mold-releasing treatment. This makes it possible to easily take out the member with concave portions 6 in the below-described method of manufacturing a microlens substrate 1, while surely preventing generation of defects such as a fracture and the like in the microlenses 21 of the base substrate 2.

Examples of the mold-releasing treatment include formation of a coating composed of a releasing material, e.g., a silicon-based resin such as alkyl polysiloxane or the like and a fluorine-based resin such as polytetrafluoroethylene or the like, a surface treatment using a silylating agent such as hexamethyldisilazane ($[(CH_3)_3Si]_2NH$), and a surface treatment using fluorine-based gases.

By way of the steps described hereinabove, it is possible to obtain a member with concave portions 6 comprised of a base plate 7 on which a multiplicity of concave portions 61' are formed in a staggering pattern, as illustrated in FIGS. 1, 2 and 3D.

Second Embodiment

Next, description will be made on a member with concave portions and a method of manufacturing the same according to a second embodiment.

Figure 9:
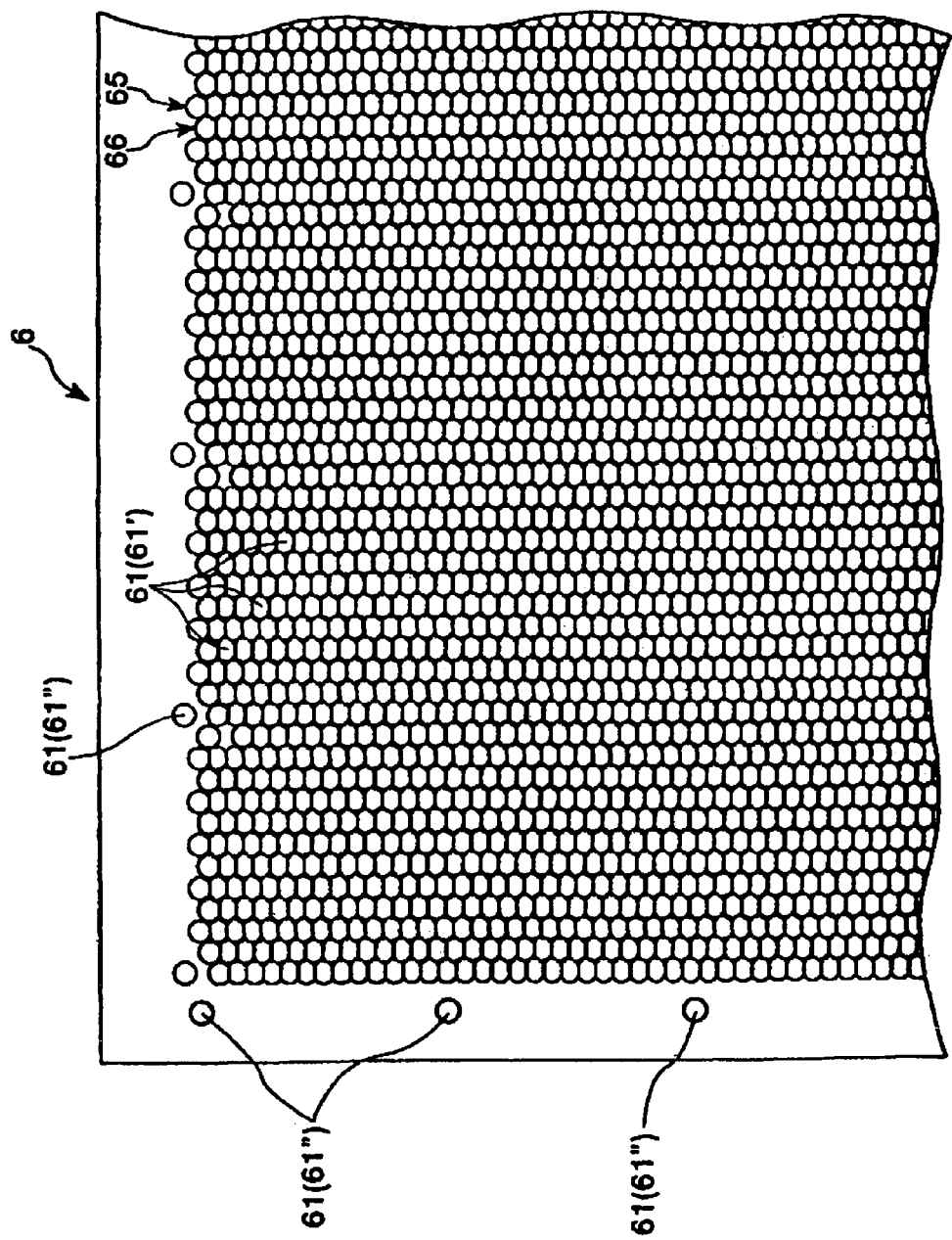
FIG. 9 is a plan view schematically showing a member with concave portions according to a second embodiment of the present invention.
Figure 10:
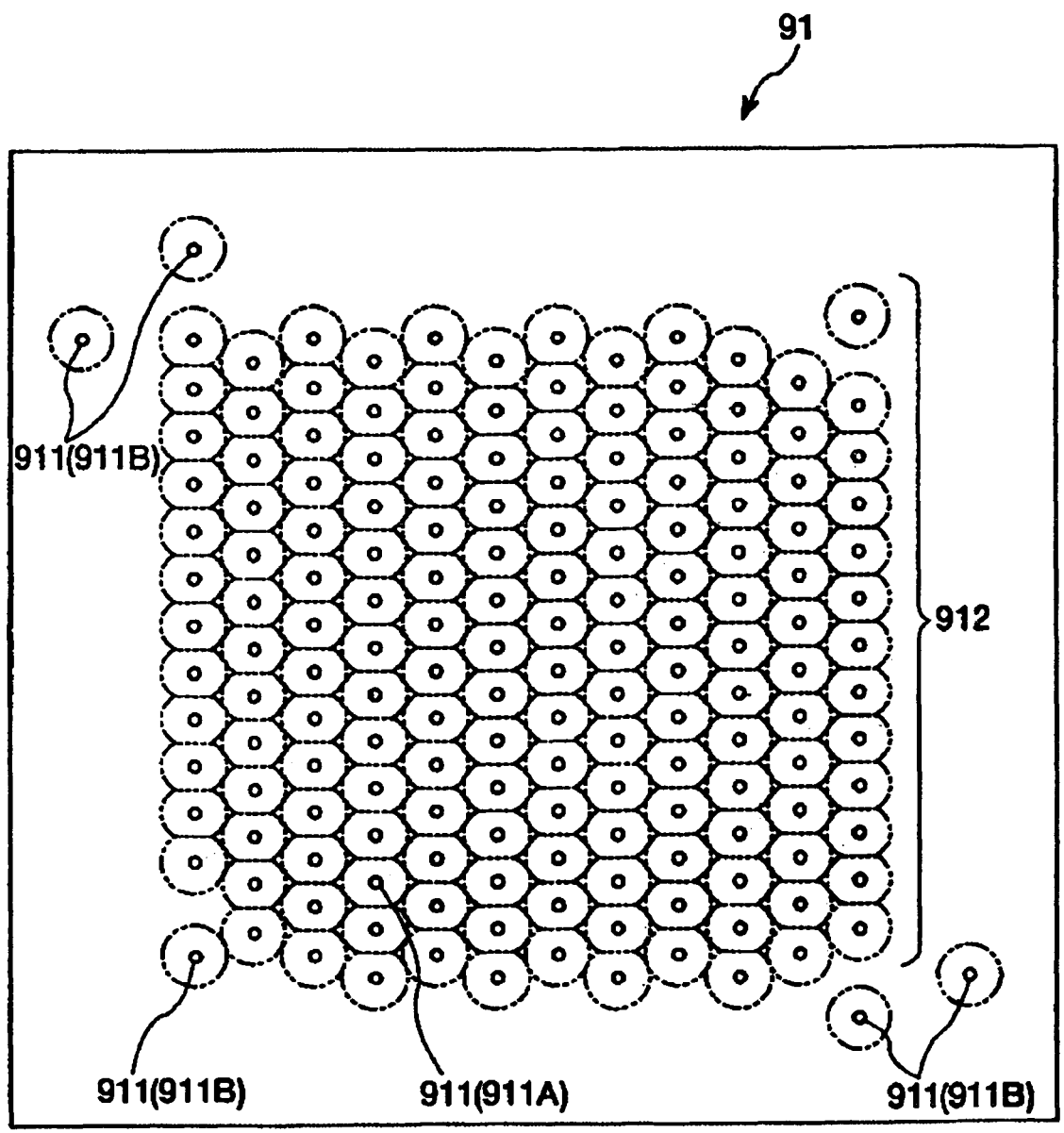
FIG. 10 is a plan view schematically showing a branching filter used in an opening forming step (a laser irradiation treatment) in a method of manufacturing a member with concave portions in accordance with a second embodiment.

FIG. 9 is a plan view schematically showing a member with concave portions according to a second embodiment of the present invention. FIG. 10 is a plan view schematically showing a branching filter used in an opening forming step (a laser irradiation treatment) in a method of manufacturing a member with concave portions in accordance with a second embodiment.

Figure 11:
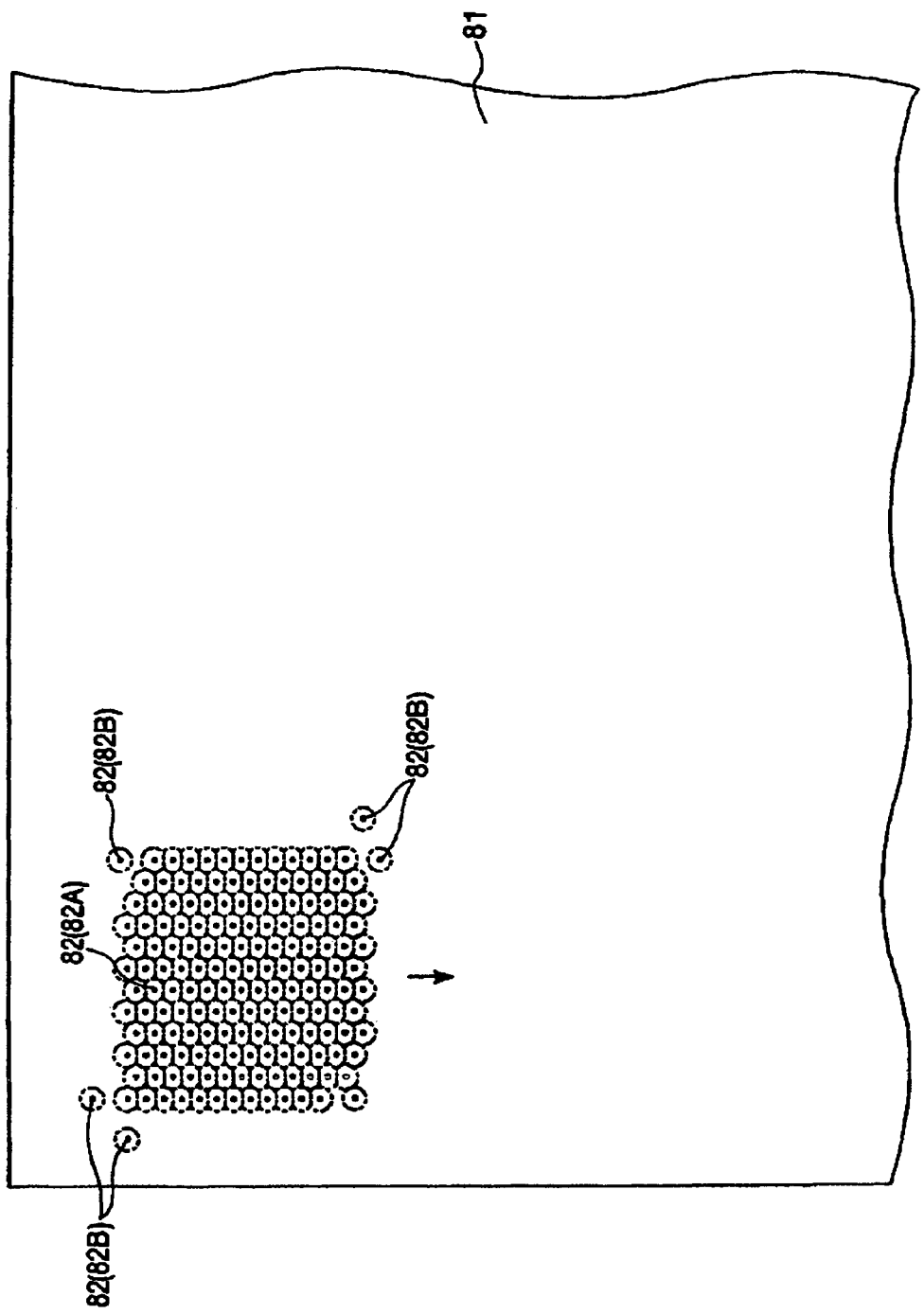
FIG. 11 is a plan view illustrating an arrangement of openings formed in a mask formation film each time a laser irradiation treatment is carried out in the method of manufacturing a member with concave portions in accordance with the second embodiment.
Figure 12:
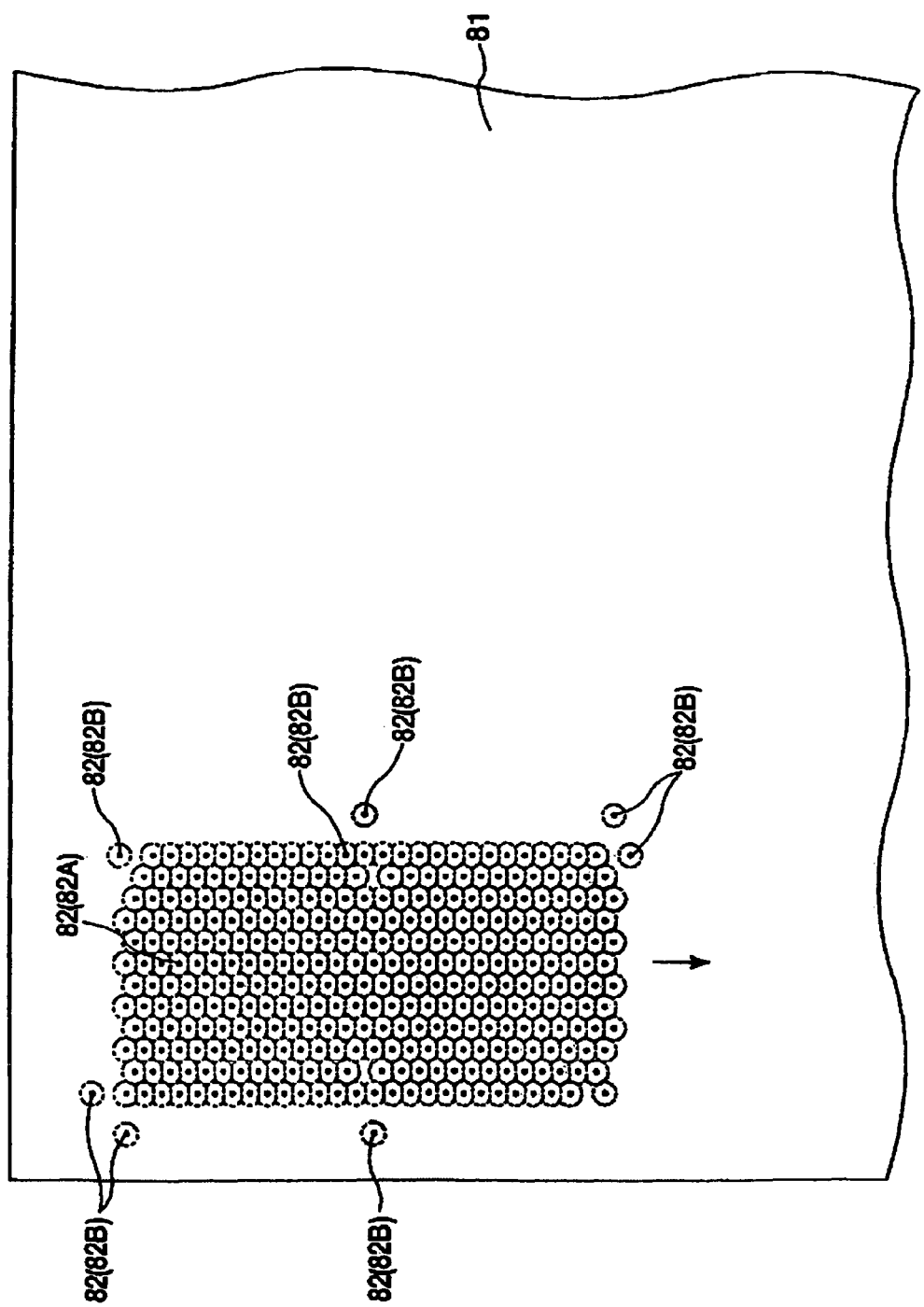
FIG. 12 is a plan view illustrating different situations that openings are sequentially formed on a group-by-group basis in the mask formation film by repeatedly performing the laser irradiation treatment.
Figure 13:
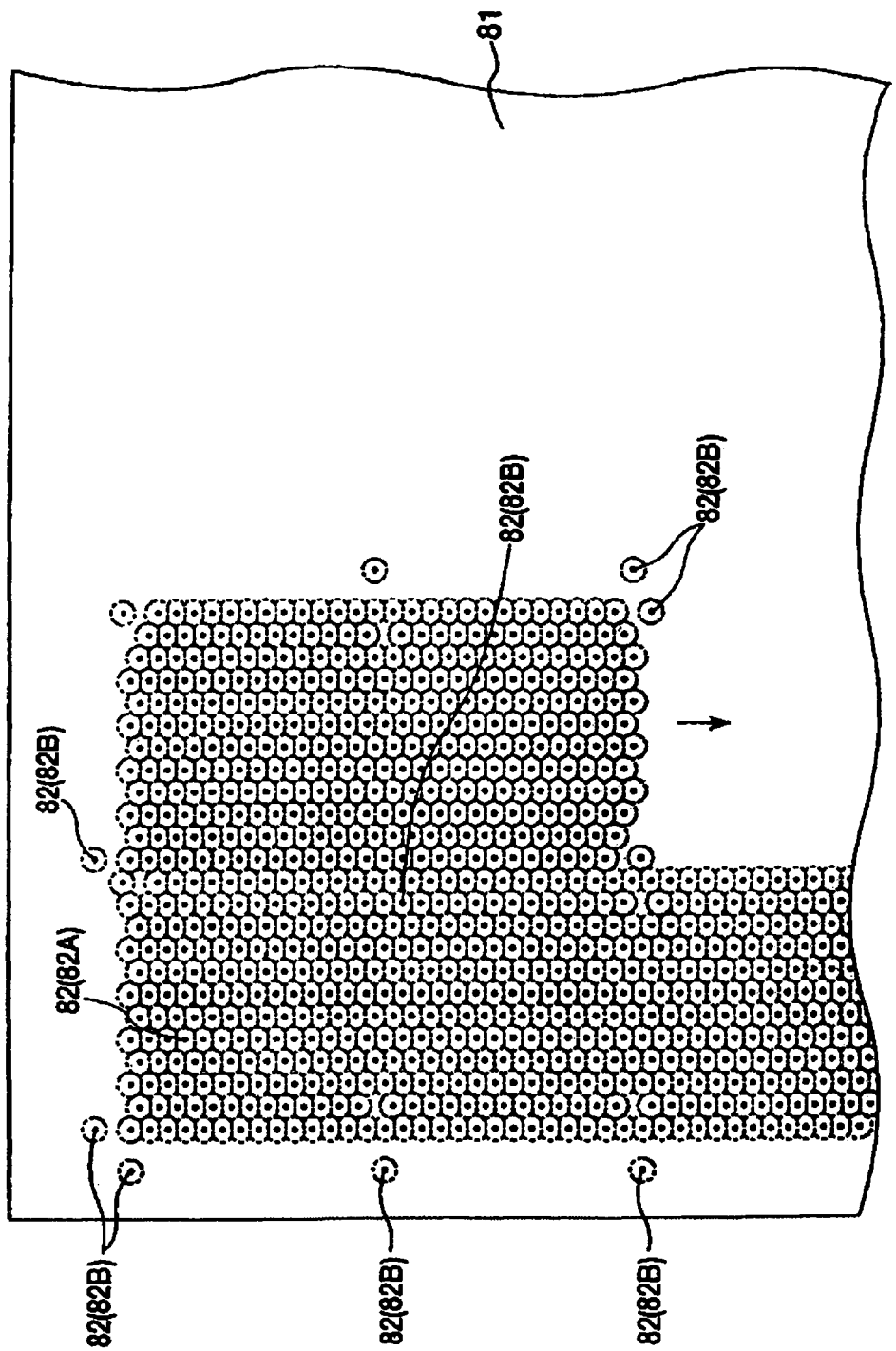
FIG. 13 is a plan view illustrating different situations that openings are sequentially formed on a group-by-group basis in the mask formation film by repeatedly performing the laser irradiation treatment.

FIG. 11 is a plan view illustrating an arrangement of openings formed in a mask formation film each time a laser irradiation treatment is carried out in the method of manufacturing a member with concave portions in accordance with the second embodiment. FIGS. 12 and 13 are plan views illustrating different situations that openings are sequentially formed on a group-by-group basis in the mask formation film by repeatedly performing the laser irradiation treatment.

From now, the member with concave portions and the method of manufacturing the same according to the second embodiment will be described in detail. The following description will be centered on the points differing from the foregoing embodiment, with the same points omitted from description.

As opposed to the member with concave portions 6 of the foregoing embodiment in which the concave portions 61" (the concave portions for examination use) having a generally circular shape when seen in a plan view are formed in such a manner as to make contact with the concave portions 61' (the concave portions for formation of the microlenses) of a flattened shape, the member with concave portions 6 of the present embodiment is configured such that the concave portions 61" (the concave portions for examination use) of a generally circular shape do not make contact with the concave portions 61' (the concave portions for formation of the microlenses) of a flattened shape (see FIG. 9).

This makes it possible to more conveniently perform measurement of the size of the concave portions 61" or other tasks in the etching step, whereby the concave portions 61' can be formed into a desired size and shape in a more reliable manner. Furthermore, this assures an easier position alignment in the opening forming step, thereby reliably preventing generation of misaligned formation of the concave portions 61' or other defects.

Furthermore, as opposed to the member with concave portions 6 of the foregoing embodiment in which the concave portions 61" (the concave portions for examination use) are provided along two sides of the member with concave portions 6 (the ineffective area), the member with concave portions 6 of the present embodiment is configured such that the concave portions 61" (the concave portions for examination use) are provided along four sides of the member with concave portions 6 (the ineffective area).

This makes it possible to perform measurement of the size of the concave portions 61" or other tasks over a broad area of the base plate 7 in the below-mentioned manufacturing process, whereby the end point of etching can be more properly determined even when a variation in etching amount is likely to occur in the respective portions within an etching apparatus (e.g., an etching bath).

Moreover, formation of the concave portions 61" in multiple numbers ensures that, even when a variation in etching amount has occurred in the respective portions within the etching apparatus (e.g., the etching bath), the orientation and disposition of the base plate 7 within the etching apparatus can be changed in such a manner as to reduce a variation in progress of etching for the respective concave portions 61" during the etching step. This makes it possible to effectively prevent occurrence of a variation in size and shape of the concave portions 61' (the concave portions for formation of the microlenses) of the member with concave portions 6.

The member with concave portions 6 of the present embodiment is substantially the same as the member with concave portions 6 of the foregoing embodiment in terms of the shape and arrangement of the concave portions 61' (the concave portions for formation of the microlenses). Furthermore, the member with concave portions 6 of the present embodiment has the same cross sectional shape as that of the member with concave portions 6 shown in FIG. 1.

Next, description will be given to the method of manufacturing a member with concave portions according to the present embodiment.

As in the foregoing embodiment, the manufacturing method of the present embodiment includes the respective steps illustrated in FIG. 3, and the openings 82 are formed in the mask formation film 81 using the laser processing apparatus 9 shown in FIG. 4.

The present embodiment differs from the foregoing embodiment in terms of the arrangement of the light transmission portions 911 provided in the branching filter 91. That is to say, with the branching filter 91 of the present embodiment, the openings 82B are formed to ensure that, when the concave portions 61" (the concave portions for examination use) formed by execution of the etching step have grown into a predetermined size (namely, when the diameter of the concave portions 61" has become equal to a design value of the maximum diameter of the concave portions 61' targeted for formation), the concave portions 61" (the concave portions for examination use) formed in alignment with the openings 82B do not touch but are isolated from the concave portions 61' (the concave portions for formation of the microlenses) formed in alignment with the neighboring openings 82A.

Use of the branching filter 91 having the light transmission portions 911 (the first light transmission portions 911A and the second light transmission portions 911B) arranged in this way makes it possible, in the etching step, to more reliably form the concave portions for examination use 61" having a perfect circle shape when seen in a plan view. As a result, a suitable time for termination of the etching operation can be determined in a more reliable manner, which makes it possible to more reliably form the concave portions 61' into a desired size and shape.

Furthermore, the branching filter 91 includes a region which is enclosed by the first light transmission portions 911A of the light transmission portion group 912 but which has empty portions where the light transmission portions that might be formed from a viewpoint of regular arrangement are missing.

Presence of such a region makes it easy to perform position alignment, when the openings 82B are formed in one or more of the subsequent laser irradiation treatments by use of the laser beams (second laser beams) transmitted through the second light transmission portions 911B, in the portions of the mask formation film 81 which lie within the region enclosed by the plurality of openings 82A formed by the laser beams (first laser beams) transmitted through the first light transmission portions 911A but in which openings have not yet been formed in a preceding laser irradiation treatment. Thus, it is possible to more reliably prevent generation of misaligned formation of the concave portions 61'.

Moreover, use of the branching filter 91 having the region as noted above ensures that, even in a hypothetical case that the light irradiated toward the branching filter 91 would show a relatively great variation in irradiation intensity in the respective regions of the branching filter 91 (in the respective regions of the irradiation region E), such a variation can be deemed to be trivial from the stand point of the mask formation film 81 as a whole. This means that the variation in size and shape of the openings 82 can be controlled in a more reliable manner, which makes it possible to prevent occurrence of irregularities in color, brightness and the like in the microlens substrate 1 finally obtained.

In addition, use of the branching filter 91 having the region as noted above ensures that, even when misalignment occurs in a position aligning process for execution of the respective laser irradiation treatments, it is possible to make less conspicuous the resultant misalignment in the arrangement of the concave portions 61 in the member with concave portions 6 and in the arrangement of the microlenses 21 in the microlens substrate 1, thereby more reliably preventing any adverse influence on the quality of an image projected.

Furthermore, even when a variation in size of the plurality of light transmission portions 911 grows relatively high, it is possible to make less conspicuous the resultant variations in size of the concave portions 61 of the member with concave portions 6 and in size of the microlenses 21 of the microlens substrate 1, thereby more reliably preventing any adverse influence on the quality of an image projected.

Then, the laser irradiation treatment is carried out several times in the same manner as in the foregoing embodiment. Thus, the openings 82 (the openings 82B corresponding to the second light transmission portions) are formed in one or more of the subsequent laser irradiation treatments by use of the laser beams (second laser beams) transmitted through the second light transmission portions 911B, in the portions of the mask formation film 81 which lie within the region having the plurality of openings 82 (the openings 82A corresponding to the first light transmission portions) formed by the laser beams (first laser beams) transmitted through the first light transmission portions 911A but in which the openings 82 (the openings 82A) have not yet been formed in a preceding laser irradiation treatment (see FIGS. 11 to 13).

Further, in each of the laser irradiation treatments on or after the second laser irradiation treatment, the openings 82A are formed by the laser beams (first laser beams) transmitted through the first light transmission portions 911A within the irradiation region E other than the openings 82B which have already been formed by the laser beams (second laser beams) transmitted through the second light transmission portions 911B in one or more of the preceding laser irradiation treatments. The mask 8 can be obtained in this way.

With the mask thus obtained, the openings 82B are arranged to enclose the outer perimeter of the effective area (namely, the openings 82B are disposed along four sides of the effective area). Thus, it is possible, over a broader area of the base plate 7, to perform measurement of the size of the concave portions 61" that are sequentially formed in the etching step, whereby the end point of etching can be more properly determined even when a variation in etching amount is likely to occur in the respective portions within an etching apparatus (e.g., an etching bath).

Moreover, formation of the multiple number of openings 82B in the mask 8 ensures that, even when a variation in etching amount has occurred in the respective portions within the etching apparatus (e.g., the etching bath), the orientation and disposition of the base plate 7 within the etching apparatus can be changed in such a manner as to reduce a variation in progress of etching for the respective concave portions 61″ during the etching step. This makes it possible to effectively prevent occurrence of a variation in size and shape of the concave portions 61′ (the concave portions for formation of the microlenses) of the member with concave portions 6.

Third Embodiment

Next, description will be made on a member with concave portions and a method of manufacturing the same according to a third embodiment.

Figure 14:
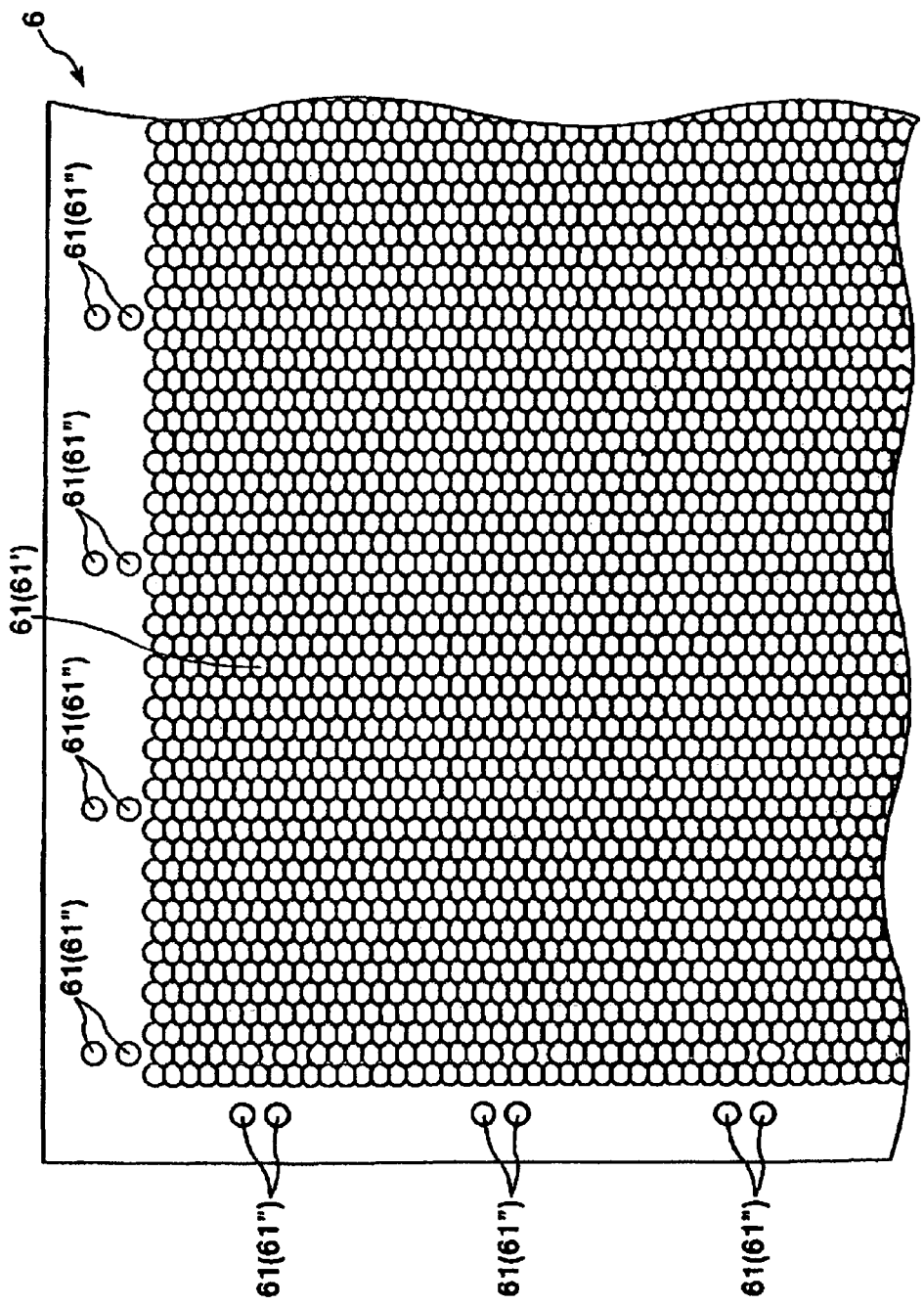
FIG. 14 is a plan view schematically showing a member with concave portions according to a third embodiment of the present invention.
Figure 15:
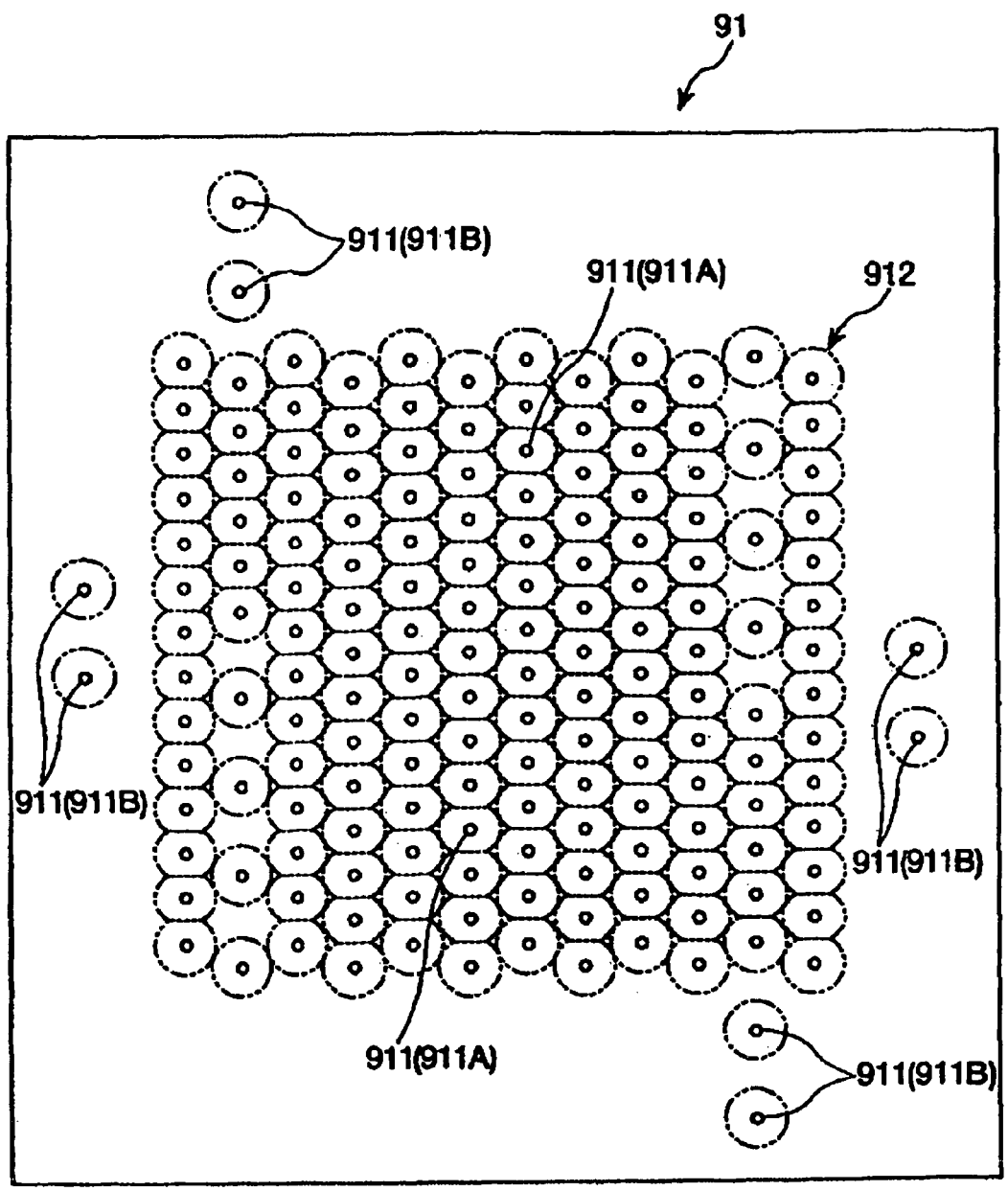
FIG. 15 is a plan view schematically showing a branching filter used in an opening forming step (a laser irradiation treatment) in a method of manufacturing a member with concave portions in accordance with a third embodiment.

FIG. 14 is a plan view schematically showing a member with concave portions according to a third embodiment of the present invention. FIG. 15 is a plan view schematically showing a branching filter used in an opening forming step (a laser irradiation treatment) in a method of manufacturing a member with concave portions in accordance with a third embodiment.

Figure 16:
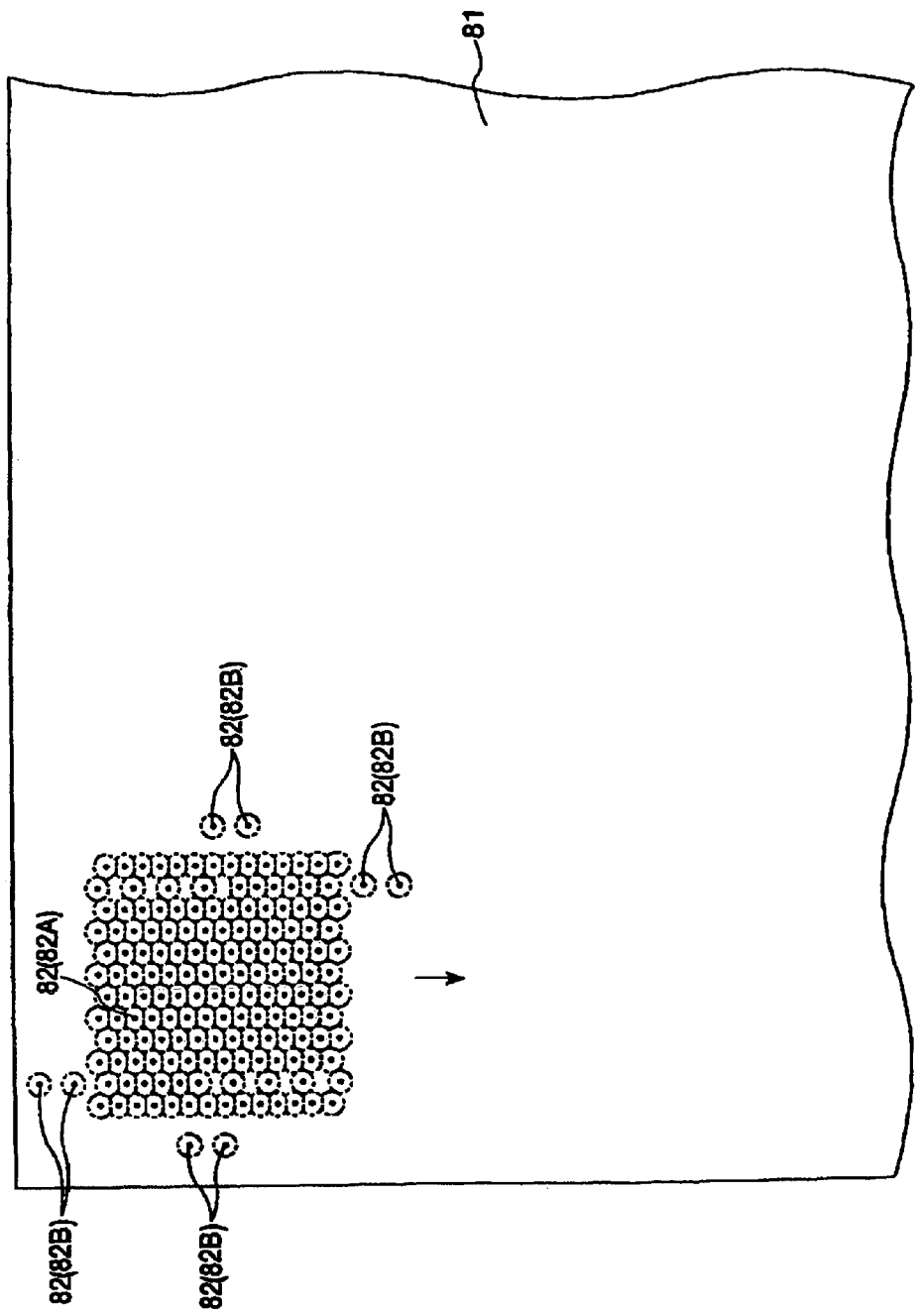
FIG. 16 is a plan view illustrating an arrangement of openings formed in a mask formation film each time a laser irradiation treatment is carried out in the method of manufacturing a member with concave portions in accordance with the third embodiment.
Figure 17:
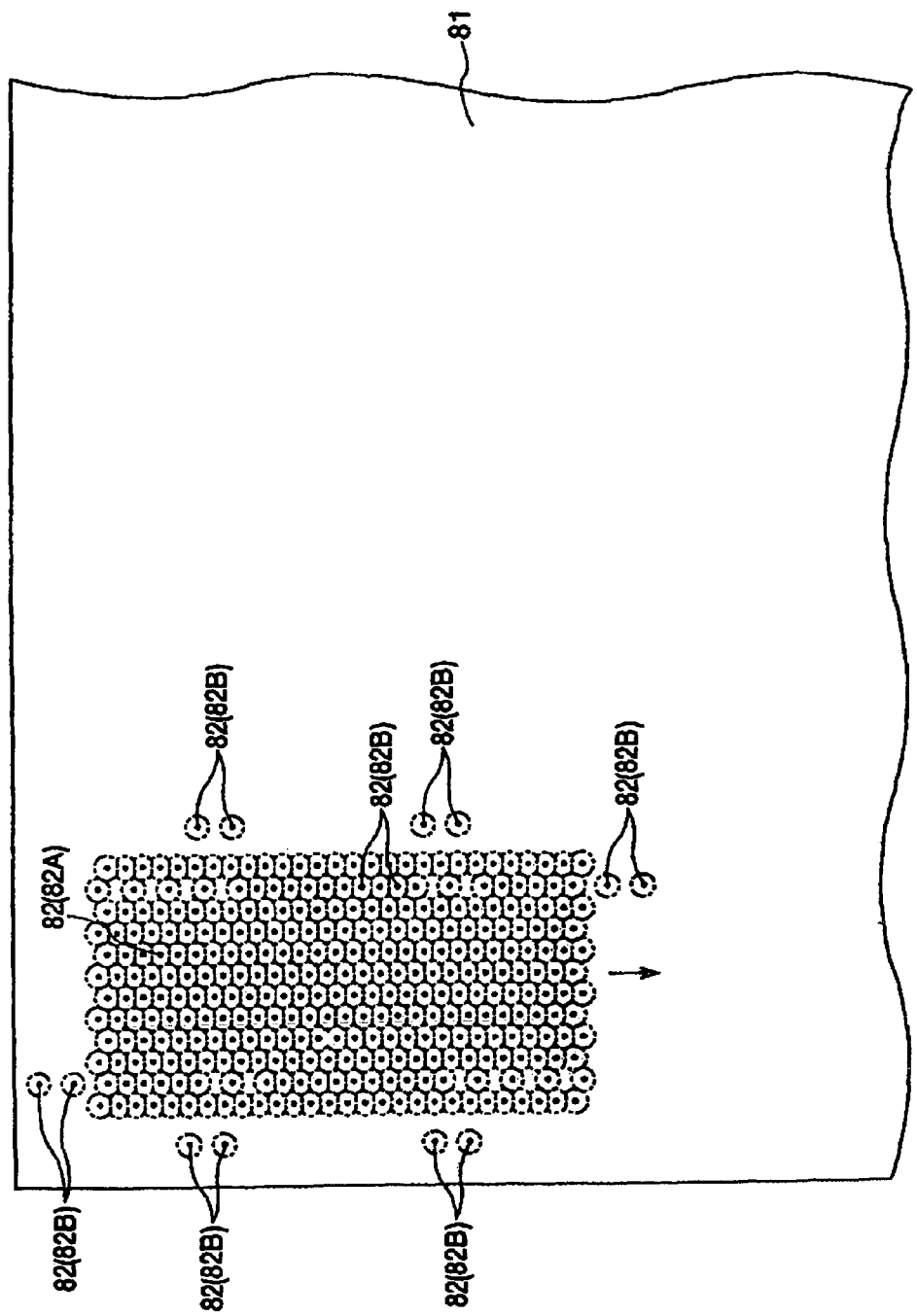
FIG. 17 is a plan view illustrating different situations that openings are sequentially formed on a group-by-group basis in the mask formation film by repeatedly performing the laser irradiation treatment.
Figure 18:
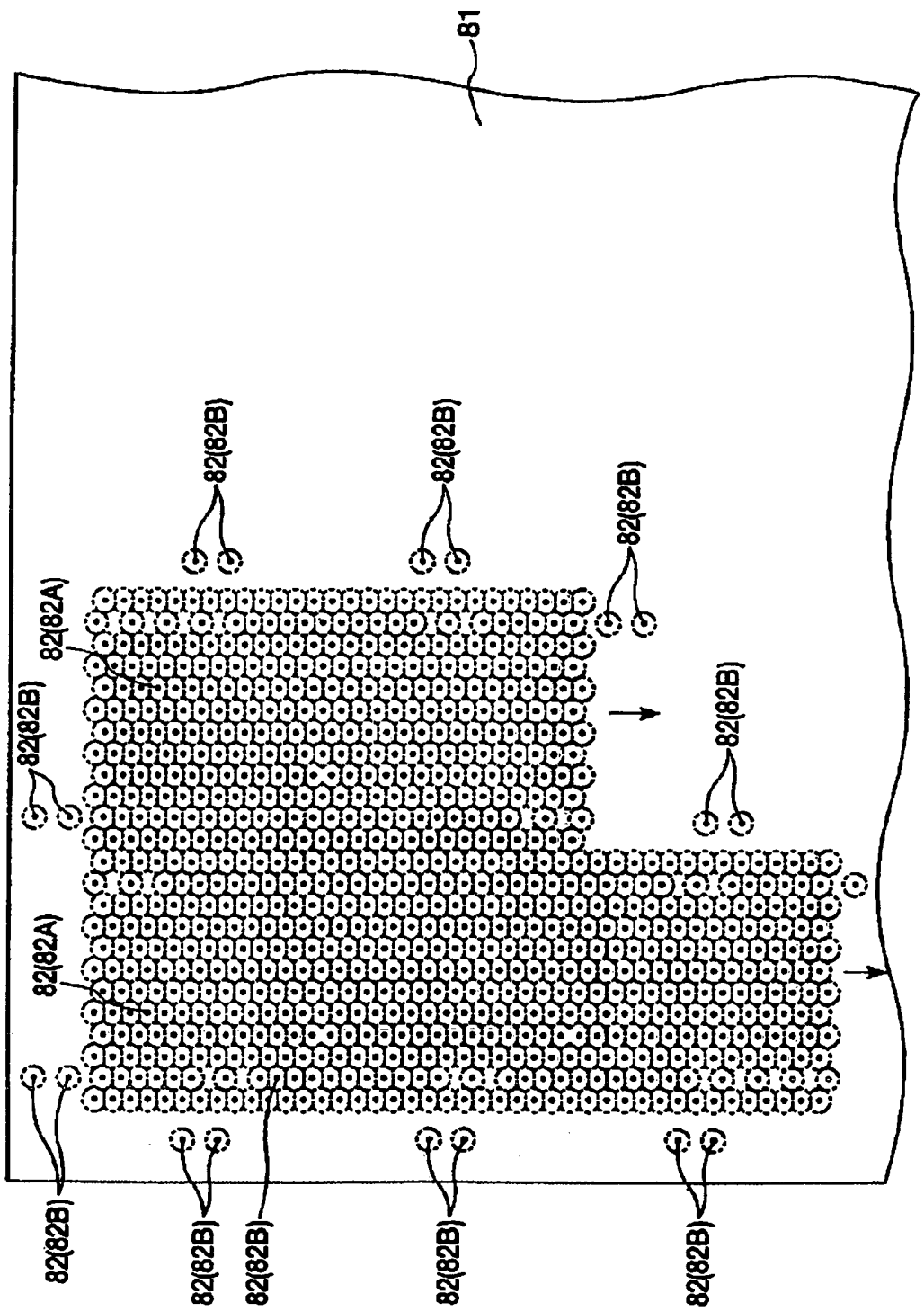
FIG. 18 is a plan view illustrating different situations that openings are sequentially formed on a group-by-group basis in the mask formation film by repeatedly performing the laser irradiation treatment.

FIG. 16 is a plan view illustrating an arrangement of openings formed in a mask formation film each time a laser irradiation treatment is carried out in the method of manufacturing a member with concave portions in accordance with the third embodiment. FIGS. 17 and 18 are plan views illustrating different situations that openings are sequentially formed on a group-by-group basis in the mask formation film by repeatedly performing the laser irradiation treatment.

From now, the member with concave portions and the method of manufacturing the same according to the third embodiment will be described in detail. The following description will be centered on the points differing from the foregoing embodiments, with the same points omitted from description.

As shown in FIG. 14, the member with concave portions 6 of the present embodiment has a plurality of concave portions 61″ (concave portions for examination use) arranged in pairs (with no concave portions 61′ for formation of the microlenses being interposed therebetween) on the extension lines of rows (or columns) of the multiplicity of concave portions 61′ (the concave portions for formation of the microlenses).

This assures an easier position alignment in the opening forming step, thereby reliably preventing generation of misaligned formation of the concave portions 61′ or other defects. Furthermore, this makes it possible to more conveniently perform measurement of the size of the concave portions 61″ or other tasks in the etching step, whereby the concave portions 61′ can be formed into a desired size and shape in a more reliable manner.

The member with concave portions 6 of the present embodiment is substantially the same as the member with concave portions 6 of the foregoing embodiments in terms of the shape and arrangement of the concave portions 61′ (the concave portions for formation of the microlenses). Furthermore, the member with concave portions 6 of the present embodiment has the same cross sectional shape as that of the member with concave portions 6 shown in FIG. 1.

Next, description will be given to the method of manufacturing a member with concave portions according to the present embodiment.

As in the foregoing embodiments, the manufacturing method of the present embodiment includes the respective steps illustrated in FIG. 3, and the openings 82 are formed in the mask formation film 81 using the laser processing apparatus 9 shown in FIG. 4. The present embodiment differs from the foregoing embodiments in terms of the arrangement of the light transmission portions 911 provided in the branching filter 91.

That is to say, as shown in FIG. 15, the branching filter 91 of the present embodiment includes a plurality of regions which are enclosed by the plurality of first light transmission portions 911A of the light transmission portion group 912 but which have empty portions where the light transmission portions that might be formed from a viewpoint of regular arrangement are missing, the regions being located on the lines of rows (or columns) of the multiplicity of first light transmission portions 911A.

This makes it to more suitably perform position alignment, when in the opening forming step, the openings 82B are formed in one or more of the subsequent laser irradiation treatments by use of the laser beams (second laser beams) transmitted through the second light transmission portions 911B, in the portions of the mask formation film 81 which lie within the regions enclosed by the plurality of openings 82A formed by the laser beams (first laser beams) transmitted through the first light transmission portions 911A but in which openings have not yet been formed in a preceding laser irradiation treatment. Thus, it is possible to more reliably prevent generation of misaligned formation of the concave portions 61′.

Moreover, even in a hypothetical case that the light irradiated toward the branching filter 91 would show a relatively great variation in irradiation intensity in the respective regions of the branching filter 91 (in the respective regions of the irradiation region E), such a variation can be deemed to be trivial from the stand point of the mask formation film 81 as a whole. This means that the variation in size and shape of the openings 82 can be controlled in a more reliable manner, which makes it possible to prevent occurrence of irregularities in color, brightness and the like in the microlens substrate 1 finally obtained.

In addition, use of the branching filter 91 as noted above ensures that, even when misalignment occurs in a position aligning process for execution of the respective laser irradiation treatments, it is possible to make less conspicuous the resultant misalignment in the arrangement of the concave portions 61 in the member with concave portions 6 and in the arrangement of the microlenses 21 in the microlens substrate 1, thereby more reliably preventing any adverse influence on the quality of an image projected.

Furthermore, even when a variation in size of the plurality of light transmission portions 911 grows relatively high, it is possible to make less conspicuous the resultant variations in size of the concave portions 61 of the member with concave portions 6 and in size of the microlenses 21 of the microlens substrate 1, thereby more reliably preventing any adverse influence on the quality of an image projected.

Then, the laser irradiation treatment is carried out several times in the same manner as in the foregoing embodiments. Thus, the openings 82 (the openings 82B corresponding to the second light transmission portions) are formed in one or more of the subsequent laser irradiation treatments by use of the laser beams (second laser beams) transmitted through the second light transmission portions 911B, in the portions of the mask formation film 81 which lie within the regions having the plurality of openings 82 (the openings 82A corresponding to the first light transmission portions) formed by the laser beams (first laser beams) transmitted through the first light transmission portions 911A but in which the openings 82 (the openings 82A) have not yet been formed in a preceding laser irradiation treatment (see FIGS. 16 to 18).

Further, in each of the laser irradiation treatments on or after the second laser irradiation treatment, the openings 82A are formed by the laser beams (first laser beams) transmitted through the first light transmission portions 911A within the irradiation region E other than the openings 82B which have already been formed by the laser beams (second laser beams) transmitted through the second light transmission portions 911B in one or more of the preceding laser irradiation treatments. The mask 8 can be obtained in this way.

Method of Manufacturing a Microlens Substrate and the Microlens Substrate Manufactured Next, description will be given to a method of manufacturing a microlens substrate 1 using the member with concave portions 6 described above and a configuration of the microlens substrate 1 produced by the method.

FIGS. 19 and 20 are vertical section views schematically illustrating one example of a method of manufacturing a microlens substrate (a lens substrate). In the following description, the lower side in FIGS. 19 and 20 will be referred to as "light incident side" or "incident side" and the upper side will be referred to as "light exit side" or "exit side".

Step B1

Figure 19A:
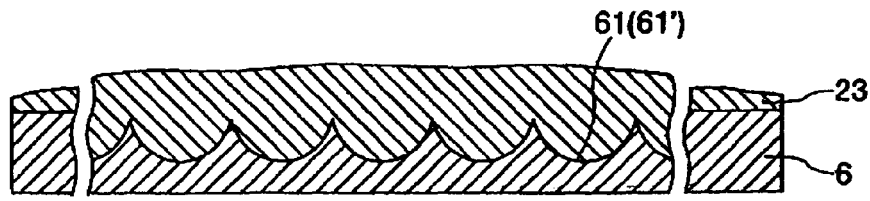
FIG. 19 is a vertical section view schematically illustrating one example of a method of manufacturing a microlens substrate.

First, a flowable composition 23 (e.g., a softened resin material and a nonpolymerized or uncured resin material) is applied on the surface of the member with concave portions 6 on which the concave portions 61 are formed, which step will be called "composition applying step" (see FIG. 19A).

Step B2

Figure 19B:
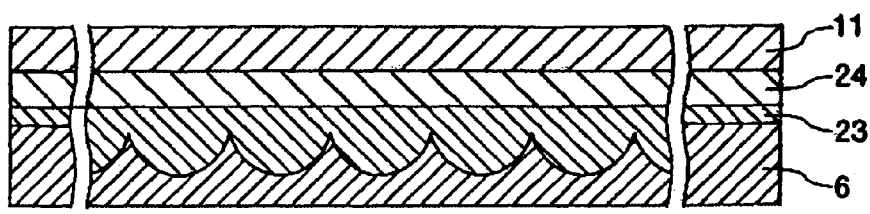

Then, a sheet material 24 (a base film) is placed on the composition 23 applied on the member with concave portions 6, and the composition 23 is pressed against the member with concave portions 6 through the sheet material 24 by means of a flat panel 11 (a pressing member), which step will be called "pressing step" (see FIG. 19B).

It is preferred that the sheet material 24 is made of a material having substantially the same refractive index as that of the composition 23 (which is solidified). More specifically, the absolute value of a difference between the absolute refractive index of a material constituting the sheet material 24 and the absolute refractive index of the composition 23 solidified is preferably equal to or smaller than 0.20, more preferably equal to or smaller than 0.10 and even more preferably equal to or smaller than 0.02.

The sheet material 24 may be constructed from any kind of material but is preferably made of polyethylene terephthalate or polycarbonate. Furthermore, the sheet material 24 may be relatively thick and substantially inflexible.

The pressing operation using the flat panel 11 may be conducted, e.g., in a state that a spacer is arranged between the member with concave portions 6 and the sheet material 24. This makes it possible to more reliably control the thickness of the base substrate 2 obtained. In the case of using the spacer, it is preferred that the spacer has already been arranged between the member with concave portions 6 and the sheet material 24 at the time when the composition 23 is solidified. However, the timing of placing the spacer in position is not subject to any particular limitation.

For example, a composition in which the spacer is dispersed preliminarily may be used as the composition 23 applied on the surface of the member with concave portions 6 on which the concave portions 61 are formed. Alternatively, the composition 23 may be applied in a state that the spacer has already been arranged on the member with concave portions 6. As a further alternative, the spacer may be arranged in place after the composition 23 has been applied.

In the case of using the spacer, it is preferred that the spacer is made of a material having substantially the same refractive index as that of the composition 23 solidified. More specifically, the absolute value of a difference between the absolute refractive index of a material constituting the spacer and the absolute refractive index of the composition 23 solidified is preferably equal to or smaller than 0.20, more preferably equal to or smaller than 0.10 and even more preferably equal to or smaller than 0.02. Most preferably, the spacer is made of the same material as the composition 23 solidified.

The spacer is preferably of a generally ball shape or a generally cylinder shape, although there is no particular limitation in the spacer shape. In the case where the spacer has such a shape, the diameter thereof is preferably 10-300 µm, more preferably 30-200 µm and even more preferably 30-170 µm.

Step B3

Figure 19C:
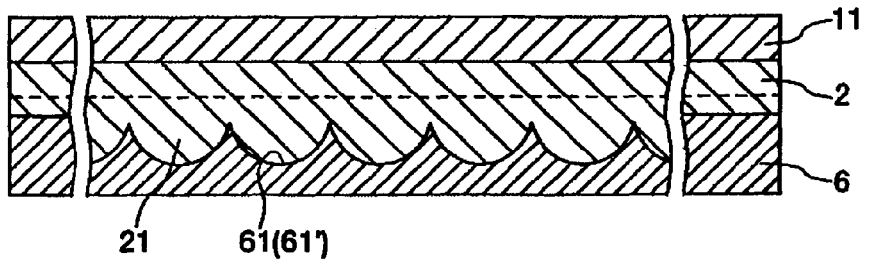

Then, the composition 23 is subject to solidification (which term is intended to cover curing and polymerization) to thereby obtain a base substrate 2 having microlenses 21 (particularly, the microlenses 21 satisfying the above-described conditions in shape, arrangement and the like), which step will be called "solidifying step" (see FIG. 19C).

In the case where the solidification of the composition 23 is carried our by virtue of curing or polymerization, examples of a method useable for that purpose include irradiation of a light such as an ultraviolet ray or the like, irradiation of an electron beam and heating.

Step B4

Figure 19D:
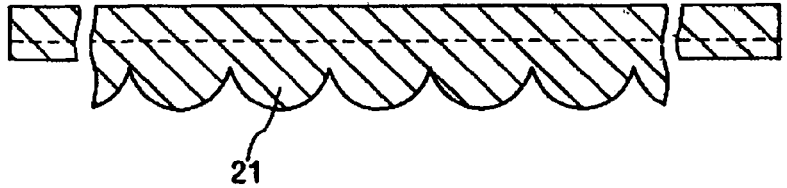

Next, the member with concave portions 6 and the flat panel 11 are removed from the base substrate 2 thus obtained, which step will be called "step of removing the pressing member and the member with concave portions" (see FIG. 19D).

The member with concave portions 6 and the flat panel 11 removed in this step can be repeatedly used for the manufacture of the microlens substrate 1. This helps to increase the stability in quality of the microlens substrate 1 manufactured and provides an advantage in terms of the production costs.

Step B5

Subsequently, a black matrix 3 (a light shielding layer) is formed on the light exit side surface of the base substrate 2 produced in this way.

In the present embodiment, formation of the light shielding layer is carried out through a step of applying a material for formation of the light shielding layer on the base substrate 2, which step will be called "light shielding layer material applying step", and a step of irradiating a light on the material for formation of the light shielding layer to form apertures, which step will be called "aperture forming step".

Although the material for formation of the light shielding layer may be any kind of materials insofar as they permits formation of the apertures, it is preferable to use a material containing a component with photosensitivity. This makes it possible to easily and reliably form the apertures into a desired shape. The following description will be primarily focused on a case that a positive photopolymer 32 is used as the material for formation of the light shielding layer.

Figure 20E:
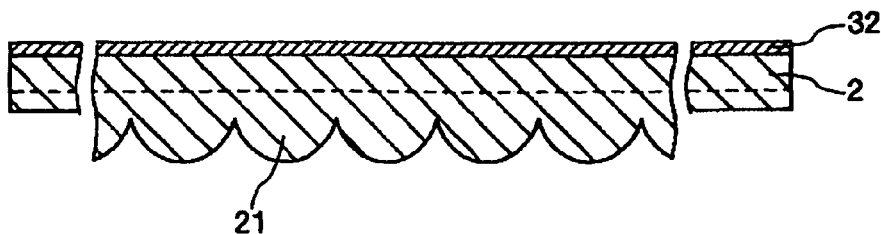
FIG. 20 is a vertical section view schematically illustrating one example of a method of manufacturing a microlens substrate.

As illustrated in FIG. 20E, the positive photopolymer 32 with a light shielding property (the material for formation of the light shielding layer) is first applied on the light exit side surface of the base substrate 2, which step will be called "light shielding layer material applying step". Examples of a method for applying the photopolymer 32 on a surface of the base substrate 2 include various coating techniques such as dip coating, doctor blade coating, spin coating, brush coating, spray coating, electrostatic coating, electrophoretic coating and roll coating.

The photopolymer 32 may be composed of either a resin with a light shielding property or a resin material with a reduced light shielding property in which a light shielding material is dispersed or dissolved. Subsequent to application of the photopolymer 32, a heat treatment such as pre-baking or the like may be conducted as the need arises.

Step B6

Next, a light (exposure light) Lb is irradiated on the base substrate 2. The light (exposure light) Lb thus irradiated is refracted and collected by the microlenses 21 as it falls on the microlenses 21. Portions of the photopolymer 32 irradiated by the light whose luminosity (light flux) was increased through the light collection are subject to exposure, while the remaining portions of the photopolymer 32 are not exposed at all or exposed with a reduced amount of exposure. Thus, the photopolymer 32 is exposed only at the portions irradiated by the light with an increased luminosity (light flux).

The light (exposure light) Lb irradiated on the base substrate 2 is preferably a parallel light, although not particularly limited thereto. This makes it possible to more reliably control the size of the apertures 31 targeted for formation. As a result, it is possible to greatly improve the viewing angle characteristics and the light use efficiency of the microlens substrate 1 in a more reliable manner, while increasing the contrast of an image projected.

Figure 20F:
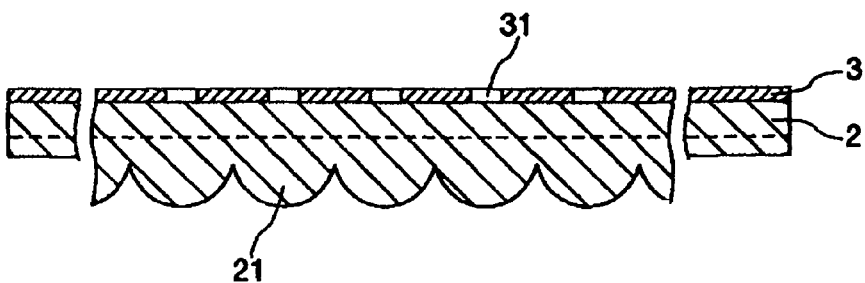

Developing is performed after the light Lb has been irradiated in the above-noted or other methods. In this regard, the photopolymer 32 is a positive type and, therefore, the portions of the photopolymer 32 irradiated by the collected light are dissolved and removed in the developing process. Consequently, as illustrated in FIG. 20F, the black matrix 3 having apertures 31 is formed. The developing can be conducted using, e.g., alkaline solution such as aqueous KOH solution or the like, although the developing method varies with the composition of the photopolymer 32 or other factors.

If, as in the present embodiment, a black matrix (a light shielding layer with apertures) is formed by irradiating a light (exposure light) collected by microlenses on a photopolymer, it becomes possible to obtain the black matrix through a simpler process than in the case of using, e.g., a photolithography technique. After the developing has been completed, it may be possible to perform a heat treatment such as post-baking or the like, if necessary.

Although the foregoing description is directed to a case that, in steps B5 and B6, the light shielding layer (the black matrix 3) is formed by using a positive photopolymer as the material for formation of the light shielding layer, other materials may be used in place of the photopolymer.

For example, materials for reversal development such as a silver halide photosensitive material may be used as the material for formation of the light shielding layer. In the case of using the silver halide photosensitive material (the reversal development material), a treatment for desalting only the exposed portions is carried out in the first place after completion of the exposure as set forth above and, subsequently, the developing is performed through an overall exposure. By using this method, the initially exposed portions can be formed into non-shielding portions with an optical transparency and the remaining portions can be formed into light shielding portions (light shielding regions).

Moreover, the light shielding layer may be formed with no use of the photosensitive material. For example, a layer composed of a material for formation of the light shielding layer other than the photosensitive material is coated on the base substrate and then irradiated by a light (an energy line). Using a light of an increased energy density collected by lens portions, different parts of the layer composed of a material for formation of the light shielding layer are cut away or evaporated to thereby produce a light shielding layer with apertures.

The method of forming the light shielding layer is not limited to the examples described above. As an alternative example, it may be possible to produce a light shielding layer with apertures, by applying a positive photosensitive adhesive on a base substrate, subjecting the same to a light irradiation treatment to create exposed portions, reducing adhesiveness of the exposed portions and applying a light shielding material on a region other than the exposed portions.

Furthermore, it may be possible to repeatedly perform the above-noted series of treatments such as application of the material for formation of the light shielding layer, irradiation of the light (exposure) and the like. This makes it possible to increase the thickness of the light shielding layer (the black matrix), which helps to further enhance the contrast of an image projected.

Although the foregoing description is directed to a case that the material for formation of the light shielding layer (the photopolymer) is directly applied on the surface of the base substrate 2 (the light exit side surface), the material for formation of the light shielding layer may not be directly applied on the surface of the base substrate 2. For example, a photosensitive material that, when exposed, does not exhibit a sufficiently high light shielding property is applied on the surface of the base substrate 2 (the light exit side surface), and a series of treatments such as developing and the like are carried out. Thereafter, it may be possible to perform the afore-described treatment using the material for formation of the light shielding layer. This enables the light shielding layer (the black matrix) to be formed thicker.

Step B7

Figure 20G:
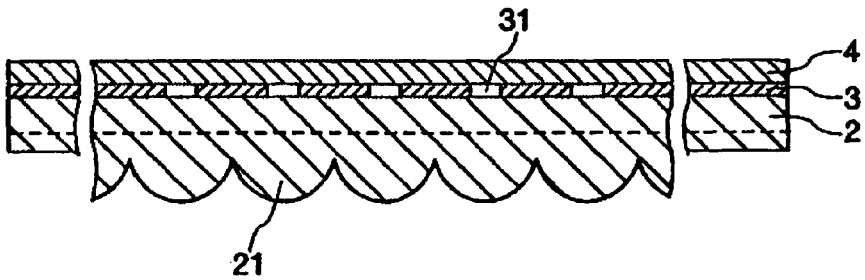

Next, as illustrated in FIG. 20G, a diffusion portion 4 is formed on the surface of the base substrate 2 on which the black matrix 3 is provided, which step will be called "diffusion portion forming step".

The diffusion portion 4 can be formed, e.g., by bonding a diffusion plate formed in advance into a plate shape to the black matrix 3, or by applying a flowable diffusion portion forming material containing a diffusing material on the black matrix 3 and then solidifying the diffusion portion forming material.

Examples of a method of applying the diffusion portion forming material include a variety of coating techniques, such as doctor blade coating, spin coating, brush coating, spray coating, electrostatic coating, electrophoretic coating and roll coating, and a dipping technique by which the base substrate 2 is dipped into the diffusion portion forming material.

Step B8

Subsequently, coloring solution is applied on the surface of the base substrate 2 on which the microlenses 21 are provided, to thereby form a colored layer 22 and eventually obtain a microlens substrate 1, which step will be called "colored layer forming step" (see FIG. 20H).

In the present embodiment, the coloring solution contains a colorant and benzyl alcohol, although it may be any kind of conventionally available coloring solution. Use of such coloring solution makes it possible to easily and reliably perform a coloring operation for the base substrate. Particularly, the coloring operation can be easily and reliably performed even for a base substrate made of a material, such as an acrylic resin or the like, which is hard to be colored in a conventional method. The reason for this is presumed to be as follow.

Specifically, if the coloring solution containing benzyl alcohol is used, benzyl alcohol present in the coloring solution is infiltrated into and diffused throughout the base substrate 2. This weakens a molecular bond (an intermolecular bond) of a material of which the base substrate 2 is made, thus leaving interstices for placement of the colorant. Benzyl alcohol and the colorant are substituted with each other, whereby the colorant is held in the interstices (which can be likened to seats for the colorant, i.e., coloring seats), thus coloring the base substrate 2.

Furthermore, use of the coloring solution noted above makes it possible to easily and reliably form a colored layer having a uniform thickness. Particularly, the colored layer can be formed with a uniform thickness (with no irregularity in color), even if the base substrate (workpiece) offered for coloring is provided on its surface with fine structures such as microlenses (asperities having small pitches in two dimensional directions) and even if the region to be colored has an increased area.

Examples of a method of applying the coloring solution include a variety of coating techniques, such as doctor blade coating, spin coating, brush coating, spray coating, electrostatic coating, electrophoretic coating, printing and roll coating, and a dipping technique by which the base substrate 2 is dipped into the coloring solution. Among these techniques, dipping (especially, dip dyeing) is preferred to use. Use of these techniques makes it possible to easily and reliably form the colored layer 22 (particularly with a uniform thickness).

Particularly, in the case of the coloring solution is applied by dip dyeing, it becomes possible to conduct coloring even if the base substrate 2 to be applied with the coloring solution is made of a material, such as an acrylic resin or the like, which is hard to be colored in a conventional method. The reason for this is presumed to be that the dyestuff usable in the dip dyeing exhibits high affinity with an ester group (ester bond) of the acrylic resin or the like.

The step of applying the coloring solution is preferably conducted in a state that at least one of the coloring solution and the base substrate 2 is kept at a temperature of 30-100° C. This makes it possible to efficiently form the colored layer 22, while surely preventing an adverse influence against the base substrate 2 on which the colored layer 22 is to be formed (e.g., degradation of a constituent material of the base substrate 2 or the like).

Furthermore, the step of applying the coloring solution is preferably conducted, e.g., under an increased atmospheric pressure (in a pressurized state). This helps to promote infiltration of the coloring solution into the base substrate 2, as a result of which the colored layer 22 can be formed efficiently in a short period of time.

Moreover, the step of applying the coloring solution may be repeated several times, if the need arises, e.g., if the colored layer 22 to be formed is relatively thick.

After the coloring solution has been applied, if necessary, it may be possible to perform heat treatments such as heating and cooling, a light irradiation treatment, an atmospheric pressure increasing or decreasing treatment and so forth. This helps to promote fixation (stabilization) of the colored layer 22.

In the following, the coloring solution used in this step will be described in more detail.

The content of benzyl alcohol in the coloring solution is preferably 0.01-10.0 wt %, more preferably 0.05-8.0 wt % and even more preferably 0.1-5.0 wt %, although not particularly limited thereto. If the content of benzyl alcohol falls within the above ranges, it is possible to easily and reliably form the colored layer 22 with good quality, while more effectively preventing an adverse influence against the base substrate 2 on which the colored layer 22 is to be formed (e.g., degradation of a constituent material of the base substrate 2 or the like).

The colorant contained in the coloring solution may be any of various kinds of dyestuffs and various kinds of pigments but is preferably a dyestuff, more preferably at least one of a dispersed dyestuff and a cationic dyestuff, and even more preferably the dispersed dyestuff. This makes it possible to efficiently form the colored layer 22, while surely preventing an adverse influence against the base substrate 2 on which the colored layer 22 is to be formed (e.g., degradation of a constituent material of the base substrate 2 or the like).

Particularly, the coloring operation can be easily and reliably performed even if the base substrate 2 to be coated with the colored layer 22 is made of a material, such as an acrylic resin or the like, which is hard to be colored in a conventional method. The reason for this is presumed to be that the colorant makes an ester group (ester bond) of the acrylic resin or the like as its dyeing seat, thus enabling the coloring operation be conducted with ease.

Further, the coloring solution used in this embodiment contains at least the colorant and benzyl alcohol, but it is preferable that the coloring solution further contains a surfactant. This makes it possible to disperse the colorant stably and evenly even under the conditions in which benzyl alcohol exists. Even if the base substrate 2 to be applied with the coloring solution is made of a material, such as an acrylic resin or the like, which is hard to be colored in a conventional method, it becomes possible to conduct coloring easily and surely.

As for the surfactant, for example, nonionic surfactants, anionic surfactants, cationic surfactants, ampholytic surfactants and the like may be mentioned. As for the nonionic surfactant, for example, ether based surfactants, ester based surfactants, ether ester based surfactants, nitrogenous based surfactants and the like may be mentioned. More specifically, polyvinyl alcohol, carboxymethylcellulose, polyethylene glycol, acrylic ester, methacrylic ester, and the like may be mentioned.

Further, as for anionic surfactants, for example, various kinds of rosins, various kinds of carboxylates, various kinds of ester sulfates, various kinds of sulfonates, various kinds of ester phosphates, and the like may be mentioned. More specifically, gum rosin, polymerized rosin, disproportionated rosin, maleic rosin, fumaric rosin, maleic rosin pentaester, maleic rosin glycerolester, tristearate (for example, metal salt such as aluminum salt), distearate (for example, metal salt such as aluminum salt, barium salt), stearate (for example, metal salt such as calcium salt, lead salt, zinc lead salt), linolenate (for example, metal salt such as cobalt salt, manganese salt, lead salt, zinc salt), octanoate (for example, metal salt such as aluminum salt, calcium salt, cobalt salt), oleate (for example, metal salt such as calcium salt, cobalt salt), palmitate (metal salt such as zinc salt), naphthenate (for example, metal salt such as calcium salt, cobalt salt, manganese salt, lead salt, zinc salt), resinate (for example, metal salt such as calcium salt, cobalt salt, manganese salt, zinc salt), polyacrylate (for example, metal salt such as sodium salt), polymethacrylate (for example, metal salt such as sodium salt), polymaleate (for example, metal salt such as sodium salt), acrylate-maleate copolymer (for example, metal salt such as sodium salt), cellulose, dodecylbezenesulfonate (for example, metal salt such as sodium salt), alkylsulfonate salt, polystyrenesulfonate (for example, metal salt such as sodium salt), alkyldiphenyletherdisulfonate (for example, metal salt such as sodium salt), and the like may be mentioned.

Further, as for cationic surfactants, for example, various kinds of ammonium salts such as primary ammonium salt, secondary ammonium salt, tertiary ammonium salt, quaternary ammonium salt may be mentioned. More specifically, monoalkylamine salt, dialkylamine salt, trialkylamine salt, tetraalkylamine salt, benzalkonium salt, alkylpyridinium salt, imidazolium salt, and the like may be mentioned. Further, as for ampholytic surfactants, for example, various kinds of betaines such as carboxybetaine, sulfobetaine, various kinds of aminocarboxylic acids, various kinds of ester phosphate salts, and the like may be mentioned.

Further, for example, at least one compound selected from a benzophenone based compound and a benzotriazole based compound may be contained in the coloring solution. This makes it possible to fulfill the effects as described above more remarkably. More specifically, this makes it possible to carry out the coloring of the base substrate 2 easily and surely.

In particular, according to the coloring processes, it is possible to subject a base substrate 2 formed of a material such as an acrylic based resin which it is difficult to color in a conventional coloring method to a coloring process easily and surely. Further, even if the process temperature in this step is lower, the colored layer 22 is formed properly and effectively in a short period of time.

It is thought that this is because, by using the at least one compound selected from the benzophenone based compound and the benzotriazole based compound and benzyl alcohol together, the at least one compound selected from the benzophenone based compound and the benzotriazole based compound interacts with benzyl alcohol in a complementary manner, and as a result, remarkable effects (synergistic effects) due to simultaneous use of them may be fulfilled (exerted).

More specifically, it is thought that this occurs due to the following reason (mechanism). To explain this mechanism in detail, benzyl alcohol in the coloring solution first loosens the bonding of molecules in the resin of the base substrate 2, whereby the spaces in which other molecules penetrate are secured.

Second, the at least one compound selected from the benzophenone based compound and the benzotriazole based compound deeply penetrates these spaces and diffuses therein. Each of the benzophenone based compound and the benzotriazole based compound has a function of loosening the bonding of molecules in the resin of the base substrate 2 and securing the spaces in which other molecules penetrate as well as benzyl alcohol. For this reason, by using the spaces secured by benzyl alcohol, each of the benzophenone based compound and the benzotriazole based compound operates to widen the spaces more deeply and more widely. In this regard, the colorant does not have this function.

Third, while the second action is occurring, the colorant penetrates the spaces secured and are held therein, or is substituted to a part of the benzophenone based compound and/or the benzotriazole based compound. In this way, by using the at least one compound selected from the benzophenone based compound and the benzotriazole based compound and benzyl alcohol together, it is possible to diffuse the colorant into the base substrate 2 more deeply efficiently in a short period of time, whereby it is possible to color the base substrate 2 evenly.

As for the benzophenone based compound, a compound shown in a chemical formula I or compounds having a benzophenone skeleton as shown in other canonical formula corresponding to the chemical formula I, these tautomers (hereinafter, referred to simply as "the compound having the benzophenone skeleton shown in the chemical formula I"), or these derivatives (for example, addition reaction products, substitution reaction products, reductive reaction products, oxidation reaction products and the like) can be utilized.

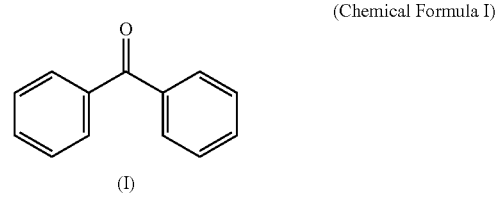

(Chemical Formula I)

As for such compounds, for example, benzophenone, 2,4-dihydroxybenzophenone, 2-hydroxy-4-methoxybenzophenone, 2,2'-dihydroxy-4,4'-dimethoxybenzophenone, 2,2',4,4-tetrahydroxybenzophenone, 2-hydroxy-4-octylbenzophenone, 4-benzyloxy-2-hydroxybenzophenone, benzophenone anil, benzophenone oxime, benzophenone chloride (α,α'-dichlorodiphenylmethane) and the like may be mentioned. The compound that has benzophenone skeleton as shown in the chemical formula I is preferable among these compounds, and more preferably the compound is any one of 2,2'-dihydroxy-4,4'-dimethoxybenzophenone and 2,2',4,4-tetrahydroxybenzophenone. By using such a benzophenone based compound, the effects described above appear remarkably. In this regard, the structural formulas (chemical formulas) of 2,2'-dihydroxy-4,4'-dimethoxybenzophenone and 2,2',4,4-tetrahydroxybenzophenone are shown in chemical formulas II, III, respectively.

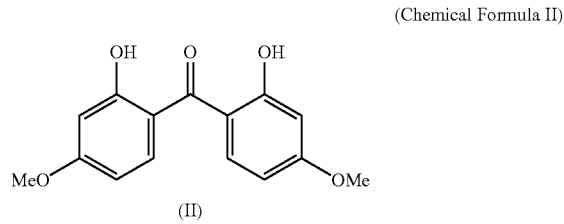

(Chemical Formula II)

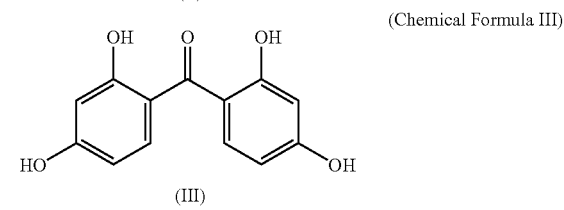

(Chemical Formula III)

Further, as for the benzotriazole based compound, a compound shown in a chemical formula IV or compounds having a benzotriazole skeleton as shown in other canonical formula corresponding to the chemical formula IV, these tautomers (hereinafter, referred to simply as "the compound having the benzotriazole skeleton shown in the chemical formula IV"), or these derivatives (for example, addition reaction products, substitution reaction products, reductive reaction products, oxidation reaction products and the like) can be utilized.

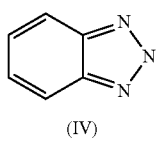

(Chemical Formula IV)

(IV)

As for such compounds, for example, benzotriazole, 2-(2-hydroxy-5-methylphenyl)-2H-benzotriazole, 2-(2-hydroxy-4-octyloxyphenyl)-2H-benzotriazole and the like may be mentioned. The compound that has benzotriazole skeleton as shown in the chemical formula IV is preferable among these compounds, and more preferably the compound is any one of 2-(2-dihydroxy-5-methylphenyl)-2H-benzotriazole and 2-(2-hydroxy-4-octyloxyphenyl)-2H-benzotriazole. By using such a benzotriazole based compound, the effects described above appear remarkably. In this regard, the structural formulas (chemical formulas) of 2-(2-dihydroxy-5-methylphenyl)-2H-benzotriazole and 2-(2-hydroxy-4-octyloxyphenyl)-2H-benzotriazole are shown in chemical formulas V, VI, respectively.

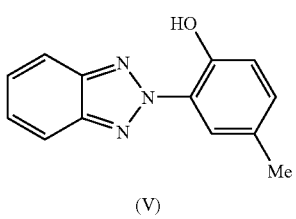

(Chemical Formula V)

(V)

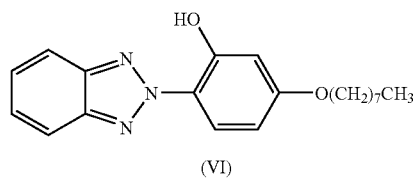

(Chemical Formula VI)

(VI)

As described above, the coloring solution includes at least one compound selected from the benzophenone based compound and the benzotriazole based compound, but may include two or more kinds of compounds selected from the benzophenone based compounds and the benzotriazole based compounds (in particular, one or more kind of the benzophenone based compound and one or more kind of the benzotriazole based compound).

In this case, these compounds interacts with each other in a complementary manner, and with benzyl alcohol in a complementary manner. Thus, the effects as described above appear further remarkably. Further, the base substrate 2 may be dipped into a preprocessing solution which includes the at least one compound selected from the benzophenone based compound and the benzotriazole based compound and benzyl alcohol, and then dipped into the coloring solution. The advantageous effects as noted hereinabove are equally attained in this case.

In the case where the benzophenone based compound and/or the benzotriazole based compound is contained in the coloring solution or the preprocessing solution, the total content of the benzophenone based compound and the benzotriazole based compound in the coloring solution or the preprocessing solution is not particularly limited.

It is preferable that the total content of the benzophenone based compound and the benzotriazole based compound in the coloring solution or the preprocessing solution is in the range of 0.001-10.0 wt %. More preferably it is in the range of 0.005-5.0 wt %, and further more preferably it is in the range of 0.01-3.0 wt %.

In the case where the total content of the benzophenone based compound and the benzotriazole based compound is restricted within the above ranges, it is possible to form the suitable easily colored layer 22 easily and surely, while preventing a harmful influence (such as deterioration of the constituent material of the base substrate 2) on the base substrate 2 on which the colored layer 22 is to be formed from being generated more efficiently.

Further, the content of the benzyl alcohol in the coloring solution or the preprocessing solution is defined as X (wt %) and the total content by percentage of the benzophenone based compound and the benzotriazole based compound in the coloring solution or the preprocessing solution is defined as Y (wt %), then it is preferable that X and Y satisfy the relation: $0.001 \leq X/Y \leq 10000$. More preferably X and Y satisfy the relation: $0.05 \leq X/Y \leq 1000$, and further more preferably X and Y satisfy the relation: $0.25 \leq X/Y \leq 500$.

In the case where X and Y satisfy the relations as described above, synergistic effects by using the benzophenone based compound and/or the benzotriazole based compound together with benzyl alcohol are exerted more remarkably. In addition, it is possible to form the suitable easily colored layer 22 with a high speed easily and surely, while preventing a harmful influence (such as deterioration of the constituent material of the base substrate 2) on the base substrate 2 on which the colored layer 22 is to be formed from being generated more efficiently.

The microlens substrate (lens substrate) 1 obtained as described above has a number of microlenses 21 which correspond in shape, size and arrangement pattern to the concave portions 61' of the member with concave portions 6.

Hereinafter, the construction of a microlens substrate 1 will be described in detail.

The microlens substrate (lens substrate) 1 includes a base substrate 2 having a number of microlenses 21 (lens portions) arranged in a predetermined pattern, a black matrix (light shielding layer) 3, and a diffusion portion 4 having a function of irregularly reflecting and diffusing the light falling thereon. Further, a colored layer (external light absorption portion) 22 is provided at the light incident side of the microlens substrate 1 (namely, the light incident side of the microlenses 21).

Generally, the base substrate 2 is composed of a light transmitting resin material. As for the constituent material of the base substrate 2, various kinds of glass materials, various kinds of resin materials and the like may be mentioned. In view of the productivity of the base substrate 2, the adhesion between the base substrate 2 and the black matrix 3, or the like, it is preferable that the constituent material of the base substrate 2 is resin material.

Examples of the resin material constituting the base substrate 2 include polyolefins such as polyethylene, polypropylene, ethylene-propylene copolymer, ethylene-vinyl acetate copolymer (EVA) and the like, cyclic polyolefin, denatured polyolefin, polyvinyl chloride, polyvinylidene chloride, polystyrene, polyamide (such as nylon 6, nylon 46, nylon 66, nylon 610, nylon 612, nylon 11, nylon 12, nylon 6-12, nylon 6-66), polyimide, polyamide-imide, polycarbonate (PC), poly-(4-methylpentene-1), ionomer, acrylic resin, acrylonitrile-butadiene-styrene copolymer (ABS resin), acrylonitrile-styrene copolymer (AS resin), butadiene-styrene copolymer, polyoxymethylene, polyvinyl alcohol (PVA), ethylene-vinyl alcohol copolymer (EVOH), polyesters such as polyethylene terephthalate (PET), polybutylene terephthalate (PBT), and polycyclohexane terephthalate (PCT), polyether, polyether ketone (PEK), polyether ether ketone (PEEK), polyether imide, polyacetal (POM), polyphenylene oxide, denatured polyphenylene oxide, polysulfone, polyether sulfone, polyphenylene sulfide, polyarylate, liquid crystal polymer such as aromatic polyester, fluoro resins such as polytetrafluoroethylene (PTFE), polyfluorovinylidene and the like, various thermoplastic elastomers such as styrene based elastomer, polyolefin based elastomer, polyvinylchloride based elastomer, polyurethane based elastomer, polyester based elastomer, polyamide based elastomer, polybutadiene based elastomer, trans-polyisoprene based elastomer, fluorocarbon rubber based elastomer, chlorinated polyethylene based elastomer and the like, epoxy resins, phenolic resins, urea resins, melamine resins, unsaturated polyester, silicone based resins, urethane based resins, and the like; and copolymers, blended bodies and polymer alloys and the like having at least one of these materials as a main ingredient.

Further, in this invention, a mixture of two or more kinds of these materials may be utilized (for example, a blended resin, a polymer alloy, a laminate body comprised of two or more layers using two or more of the materials mentioned above).

The material (solidified material) constituting the base substrate 2 may have an absolute refractive index greater than that of various kinds of gases (an atmospheric gas in which the microlens substrate 1 is used) in usual cases. Specifically, the absolute refractive index is preferably 1.35-1.9 and more preferably 1.40-1.75. If the absolute refractive index of the material constituting the base substrate 2 falls within the above ranges, it is possible to greatly improve the viewing angle characteristics, while keeping the light (incident light) use efficiency remarkably high.

The microlens substrate 1 is provided with a plurality of microlenses (lens portions) 21 in the form of convex lenses whose convex surface lies at a light incident side of the microlens substrate 1.

With the microlens substrate (lens substrate) 1, the microlenses (lens portions) 21 have a flattened shape (generally elliptical shape or generally rectangular round shape) with a longitudinal (vertical) width being smaller than a transverse (horizontal) width when the microlens substrate 1 is seen in a plan view.

Formation of the microlenses 21 into this shape greatly improves the viewing angle characteristics, while effectively preventing generation of drawbacks such as a moire and the like. In particular, the viewing angle characteristics become excellent both in the horizontal direction and in the vertical direction.

Assuming that, when the microlenses 21 are seen in a plan view, the minor axis direction (longitudinal) length of each microlens 21 is $L_1$ (μm) and the major axis direction (transverse) length of each microlens 21 is $L_2$ (μm), it is preferable to satisfy the relationship $0.10 \leq L_1/L_2 \leq 0.99$, more preferable to satisfy the relationship $0.50 \leq L_1/L_2 \leq 0.95$, and even more preferable to satisfy the relationship $0.60 \leq L_1/L_2 \leq 0.80$. Satisfaction of these relationships further enhances the above-identified advantageous effects.

The minor axis direction length of each microlens 21 (the longitudinal width of each microlens 21) when the microlenses 21 are seen in a plan view is preferably 10-500 μm, more preferably 30-300 μm, and even more preferably 50-100 μm. If the minor axis direction length of each microlens 21 falls within the above ranges, it is possible to achieve a high enough resolution in an image projected to a screen, while effectively preventing generation of drawbacks such as a moire and the like. It is also possible to further increase the productivity of the microlens substrate 1 (the transmission type screen 10).

Furthermore, the major axis direction length of each microlens 21 (the transverse width of each microlens 21) when the microlenses 21 are seen in a plan view is preferably 15-750 μm, more preferably 45-450 μm, and even more preferably 70-150 μm. If the major axis direction length of each microlens 21 falls within the above ranges, it is possible to achieve a high enough resolution in an image projected to a screen, while effectively preventing generation of drawbacks such as a moire and the like. It is also possible to increase the productivity of the microlens substrate 1 (the transmission type screen 10).

Moreover, the radius of curvature of each microlens 21 is preferably 7.5-375 μm, more preferably 22.5-225 μm, and even more preferably 35-75 μm. If the radius of curvature of each microlens 21 falls within the above ranges, it is possible to greatly improve the viewing angle characteristics. Especially, the viewing angle characteristics become excellent both in the horizontal direction and in the vertical direction. The radii of curvature of each microlens 21 in the minor axis direction and in the major axis direction may differ from each other, in which case it is preferred that the radius of curvature in the major axis direction falls within the above ranges.

In addition, the depth (height) of each microlens 21 is preferably 7.5-375 μm, more preferably 22.5-225 μm, and even more preferably 35-75 μm. If the depth of each microlens 21 falls within the above ranges, it becomes possible to greatly improve the light use efficiency and the viewing angle characteristics.

The plurality of microlenses 21 are arranged in a staggering pattern (in a houndstooth check pattern). Arranging the microlenses 21 in this manner makes it possible to effectively prevent generation of drawbacks such as a moire and the like.

As described above, in the present embodiment, the microlenses 21 are arranged in a houndstooth check pattern when the microlens substrate 1 is seen in a plan view. It is however preferred that first rows of microlenses 21 are staggered in the longitudinal direction by one half pitch from second neighboring rows of microlenses 21. This makes it possible to more effectively prevent generation of a moire and other drawbacks, which would otherwise appear by light interference. It is also possible to greatly improve the viewing angle characteristics.

Furthermore, when the microlens substrate 1 is seen in a plan view from the light incident side, the occupying ratio of the microlenses 21 in the effective area in which the microlenses 21 are formed is preferably 90% or more, more preferably 96% or more, and even more preferably 97% or more. If the occupying ratio of the microlenses 21 falls within the above ranges, it is possible to further improve the light use efficiency and also to make the brightness and contrast of a projected image exceptionally good.

By strictly defining the shape, arrangement pattern and the like of the microlenses 21 as set forth above, it is possible to greatly improve the viewing angle characteristics, while effectively preventing generation of a moire, which would otherwise appear by light interference, and other drawbacks.

In particular, if the shape, arrangement pattern and the like of the microlenses 21 are strictly defined as set forth above, the advantageous effects provided by the above-noted shape and arrangement pattern of the microlenses 21 act synergistically with the advantageous effects provided by the presence of the black matrix 3 and the colored layer 22, thereby giving rise to remarkably advantageous effects in terms of, e.g., the viewing angle characteristics and the light use efficiency.

Moreover, each microlens 21 is provided in the form of a convex lens protruding toward the light incident side and is designed so that a focal point f thereof can be placed in the vicinity of the light exit side surface of the base substrate 2 and at around each aperture 31 of the black matrix (the light shielding layer) 3.

That is to say, the light La falling on the microlens substrate 1 in a direction generally perpendicular thereto (the parallel light La emerging from a Fresnel lens section 5) is collected in the respective microlenses 21 of the microlens substrate 1 and then forms a focal point f in the vicinity of the light exit side surface of the base substrate 2 and at around each aperture 31 of the black matrix (the light shielding layer) 3.

By allowing each microlens 21 to create the focal point f in the vicinity of the light exit side surface of the base substrate 2 and at around each aperture 31 of the black matrix (the light shielding layer) 3 as described just above, it is possible to make the light use efficiency exceptionally good. As a result, the image formed by the light transmitted through the microlens substrate 1 exhibits a remarkably high contrast.

Moreover, as described above, the colored layer 22 is provided at the light incident side of the microlens substrate 1 (namely, the light incident side of the microlenses 21). The colored layer 22 has a function of allowing the light falling at the light incident side to sufficiently pass therethrough and a function of preventing an external light (e.g., an external light unintentionally falling at the light exit side) from being reflected toward the light exit side.

Presence of such a colored layer 22 makes it possible to obtain an image with a high contrast. Particularly, combined use of the colored layer 22 and the black matrix 3 enables these functions to act synergistically with each other, thereby sharply increasing the contrast of a displayed image.

Particularly, in the present embodiment, the colored layer (dyed layer) 22 is formed by applying the coloring solution (especially, the coloring solution having a feature in its composition) on the base substrate 2 as set forth above. If the colored layer 22 is formed in this way (by dyeing), it shows a high degree of adhesion, as compared to a case that a colored layer is separately prepared and laminated on the base substrate. Consequently, it is possible to more reliably prevent the optical characteristics of the microlens substrate from being adversely affected by, e.g., a change in refractive index in the vicinity of a surface boundary.

Furthermore, owing to the fact that the colored layer 22 is formed by applying the coloring solution on the base substrate 2, a thickness variation in the respective portions thereof (especially, a thickness variation not conforming to the surface shape of the base substrate 2) is kept small. This makes it possible to more reliably prevent creation of defects, such as a color irregularity and the like, in a projected image.

Although the colored layer 22 is made of a material containing a colorant, the major components thereof are usually the same as those of the base substrate 2 (the microlenses 21). This means that a sharp change in refractive index is less likely to occur at the boundary between the colored layer 22 and the remaining non-colored portions. Thus, it becomes easy to design the optical characteristics for the microlens substrate 1 as a whole, thereby ensuring that the microlens substrate 1 exhibits stable and highly reliable optical characteristics.

The colored layer 22 is formed to have an external appearance of a black color, one of achromatic colors, by using a colorant having a basic blue color mixed with a red, brown or yellow color, although not particularly limited thereto. Preferably, the colored layer 22 is of the type selectively absorbing or transmitting a light of a specified wavelength that controls the balance of three primary colors of a light emerging from a light source.

This makes it possible to prevent reflection of an external light, accurately express the color tone of an image formed by the light transmitted through the microlens substrate, broaden the chromatic coordinate (sufficiently broaden the extent of expression of the color tone) and make the black color deeper. As a result, it is possible to make the contrast exceptionally good.

Furthermore, the black matrix (light shielding layer) 3 is provided on the light exit side surface of the base substrate 2. The black matrix 3 is made of a light shielding material and formed into a film-like shape.

Presence of such a black matrix 3 ensures that an external light (an external light undesirable in forming a projection image) is absorbed by the black matrix 3, which makes it possible to increase the contrast of an image projected to a screen. Particularly, combined use of the colored layer 22 and the black matrix 3 enables the microlens substrate 1 to create an image with a remarkably increased contrast.

The black matrix 3 as noted above is provided with the apertures 31 on the light paths through which the light from the respective microlenses 21 passes. This ensures that the light collected in the respective microlenses 21 can pass the apertures 31 of the black matrix 3 with increased efficiency. As a result, it is possible to enhance the light use efficiency of the microlens substrate 1.

The apertures 31 are formed with such a size that they can effectively avoid reflection of an external light in the portions of the black matrix 3 other than the apertures 31, while surely preventing an image forming light from being absorbed or reflected by the black matrix 3.

The apertures 31 of the black matrix 3 may be of any shape but is preferably of a generally circular shape as seen in a plan view. In this case, the diameter of the apertures 31 is preferably 5-100 µm, more preferably 15-90 µm and even more preferably 20-70 µm, although there is no particular limitation in their size. This ensures that an image projected to a screen exhibits a higher contrast.

Furthermore, the thickness (average thickness) of the black matrix 3 is preferably 0.3-8 µm, more preferably 0.8-7 µm and even more preferably 1.4-6 µm. If the thickness of the black matrix 3 falls within the above ranges, it is possible to more reliably prevent the black matrix 3 from being unintentionally peeled off or cracked, while allowing the black matrix 3 to effectively exercise its own function (namely, the function of increasing the contrast of an image). This makes it possible to remarkably increase the contrast of an image projected to, e.g., the transmission type screen 10 having the microlens substrate 1.

Moreover, the area ratio (aperture ratio) of the apertures 31 relative to the black matrix 3 when seen in a plan view is preferably 5-50%, more preferably 10-35% and even more preferably 15-25%. If the aperture ratio falls within the above ranges, it becomes possible to sufficiently inhibit an external light (e.g., an external light inadvertently falling at the side opposite from the light incident side) from being reflected toward the light exit side. It is also possible to remarkably improve the light use efficiency and to prevent infiltration of an external light, whereby the contrast of an image obtained grows very high and the viewing angle characteristics of the microlens substrate 1 are greatly improved.

In contrast, if the aperture ratio is smaller than the lower limit values noted above, it may be difficult to keep excellent the light use efficiency and the viewing angle characteristics. On the other hand, if the aperture ratio exceeds the upper limit values noted above, reflection of an external light cannot be sufficiently suppressed. This may make it difficult to prevent infiltration of an external light and to keep sufficiently high the contrast of an image obtained.

Furthermore, the diffusion portion 4 is provided on the light exit side surface of the microlens substrate 1. The diffusion portion 4 functions to irregularly reflect and diffuse the light falling thereon (the incident light). Presence of the diffusion portion 4 makes it possible to improve the viewing angle characteristics.

Moreover, the diffusion portion 4 is provided in a region located at the light exit side of the black matrix 3. This construction allows the light falling on the diffusion portion 4 to be directed toward the light exit side (the opposite side from the light incident side) in an efficient manner, thereby greatly improving the viewing angle characteristics of the transmission type screen 10 (greatly increasing the viewing angle, i.e., the visibility of an image projected to a screen).

In the present embodiment, the diffusion portion 4 is made of an essentially transparent material with good optical transparency (e.g., an acrylic resin and a polycarbonate resin) in which a diffusing material is dispersed. Examples of the diffusing material include silica, glass and resins, all of which are in a particulate form. The average particle size of the diffusing material is preferably 1-50 μm and more preferably 2-10 μm, although not particularly limited thereto.

The thickness of the diffusion portion 4 is preferably 0.05-5 mm, more preferably 0.7-4 mm and even more preferably 1.0-3 mm, although not particularly limited thereto. If the thickness of the diffusion portion 4 falls within the above ranges, it becomes possible to greatly improve the viewing angle characteristics, while keeping the light use efficiency sufficiently high.

In contrast, if the thickness of the diffusion portion 4 is smaller than the lower limit values, there is a possibility that the advantageous effects may not be sufficiently exercised by the diffusion portion 4. On the other hand, if the thickness of the diffusion portion 4 exceeds the upper limit values, the probability or frequency of the light (photons) being collided with the diffusing material tends to be increased sharply, and optical quenching is likely to occur. There is also an increased possibility that the light (photons) falling into the diffusion portion 4 may be turned back to the light incident side. As a consequence, it may be difficult to keep the light use efficiency sufficiently high.

The microlens substrate (lens substrate) 1 is high in the light use efficiency. The light use efficiency of the microlens substrate 1 (the ratio of a quantity of the light leaving the light exit side of the microlens substrate 1 to a quantity of the light falling at the light incident side of the microlens substrate 1) is preferably 65% or more, more preferably 75% or more and even more preferably 85% or more.

Transmission Type Screen

Next, description will be made on the transmission type screen 10 provided with the microlens substrate 1 as set forth above.

Figure 20H:
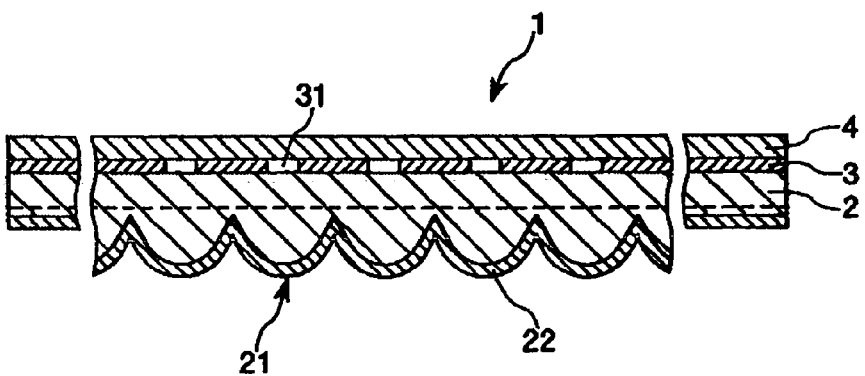
Figure 21:
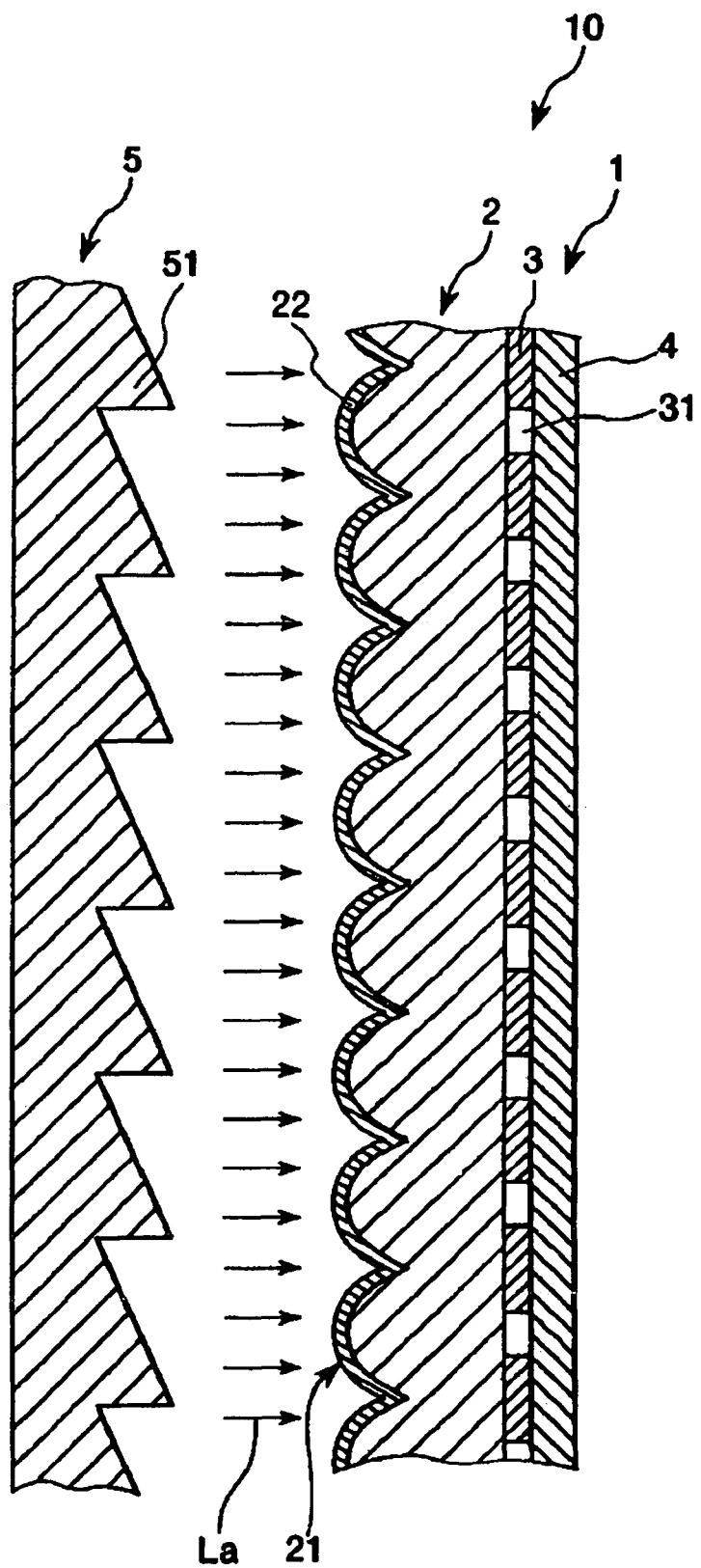
FIG. 21 is a schematic vertical section view illustrating one preferred embodiment of the transmission type screen in accordance with the present invention, which incorporates the microlens substrate (lens substrate).

FIG. 21 is a schematic vertical section view illustrating one preferred embodiment of the transmission type screen 10 in accordance with the present invention, which incorporates the microlens substrate (lens substrate) 1 shown in FIG. 20H.

Referring to FIG. 21, the transmission type screen 10 includes the Fresnel lens section 5 and the microlens substrate 1 described above. The Fresnel lens section 5 is provided at the incident side of the light (image light) so that the light transmitted through the Fresnel lens section 5 can fall on the microlens substrate 1.

The Fresnel lens section 5 is provided with Fresnel lenses 51 of a prism shape which are generally concentrically formed on its light exit side surface. The Fresnel lens section 5 serves to refract an image light emerging from a projection lens (not shown) into a parallel light La that advances in parallel with the direction perpendicular to a major surface of the microlens substrate 1.

With the transmission type screen 10 configured as above, the image light emerging from the projection lens is refracted and turned to a parallel light La by means of the Fresnel lens section 5. Then, the parallel light La falls at the side opposite from the side of the microlens substrate 1 on which the black matrix 3 is formed. The parallel light La is collected by the respective microlenses 21 and then diffused upon formation of a focal point. At this time, the light falling on the microlens substrate 1 can pass it with a sufficiently high transmittance. The light moving past the apertures 31 is diffused to provide a planar image visible by a viewer.

Rear Projection

Next, description will be given to the rear projection employing the transmission type screen as set forth above.

Figure 22:
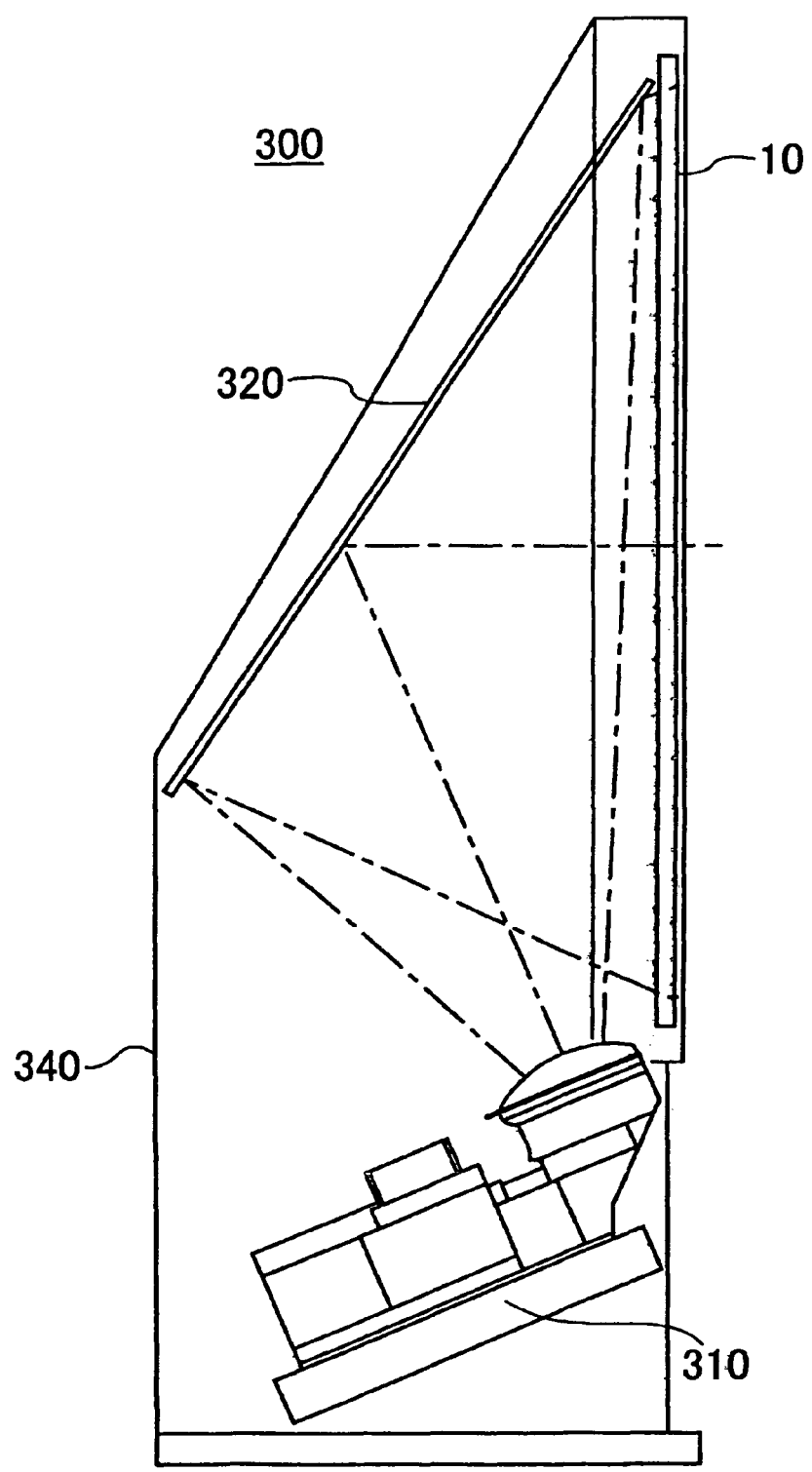
FIG. 22 is a view schematically illustrating a configuration of the rear projection in accordance with the present invention.

FIG. 22 is a view schematically illustrating a configuration of the rear projection in accordance with the present invention.

As illustrated in FIG. 22, the rear projection 300 includes a projection optical unit 310, a light guiding mirror 320 and a transmission type screen 10, all front opening 12 which are arranged within a housing 340. The rear projection 300 makes use of the afore-mentioned transmission type screen 10 as its transmission type screen 10 and therefore shows a good display quality.

While the present invention has been described above in respect of the illustrated embodiments, the present invention is not limited thereto. For example, one or more arbitrary step may be added, if necessary, to the method of manufacturing a member with concave portions in accordance with the present invention.

The branching filter may be of any form, insofar as it includes a light transmission portion group consisting of a multiplicity of first light transmission portions and provided in a predetermined region, and second light transmission portions provided in a region differing from that of the light transmission portion group (out of the predetermined region). In other words, the branching filter is not limited to the ones employed in the foregoing embodiments but may be of any form.

In the foregoing embodiments, the member with concave portions (the member with concave portions used in manufacturing the lens substrate) finally obtained is provided with the concave portions for examination purpose. Alternatively, the region in which the concave portions for examination use are formed may be removed by cutting or other methods in the process of manufacturing the lens substrate. Similarly, the lens substrate may not be provided with the convex portions otherwise formed by the concave portions for examination use.

In the foregoing embodiments, when manufacturing the lens substrate (the base substrate), the member with concave portions is repeatedly used as a mold and detached from the base substrate once the latter is produced. However, the member with concave portions may not be necessarily detached from the base substrate 2. In other words, the member with concave portions may constitute a part of the lens substrate.

In the foregoing embodiments, at the time when a laser irradiation treatment is carried out for an irradiation region E (a second irradiation region) adjacent to an arbitrary irradiation region E (a first irradiation region), the openings 82 (openings 82B) are formed in the portions which lie within the first irradiation region but in which the openings 82 (openings 82A) have not yet been formed.

As an alternative, it may be possible that, at the time when a laser irradiation treatment is carried out for an irradiation region E (a third irradiation region) not adjacent to the first irradiation region, the openings 82 (openings 82B) are formed in the portions which lie within the first irradiation region but in which the openings 82 (openings 82A) have not yet been formed. This makes it possible to effectively prevent misaligned formation of the openings 82.

In foregoing embodiments, the member with concave portions is utilized as a mold when manufacturing the lens substrate (the base substrate). Alternatively, the member with concave portions in itself may be used as the lens substrate (the base substrate).

In foregoing embodiments, the member with concave portions is formed of a plate-like member (a plate with concave portions). Alternatively, the member with concave portions may be of, e.g., a roll shape. This makes it possible to greatly improve the productivity of the lens substrate.

Individual parts constituting the member with concave portions, the lens substrate (microlens substrate), the transmission type screen and the rear projection may be substituted by other arbitrary ones capable of performing like functions. Moreover, arbitrary constituent parts may be added if necessary.

In foregoing embodiments, the lens substrate is formed of the microlens substrate with microlenses. Alternatively, the lens substrate may be a lenticular lens.

Furthermore, one or more arbitrary step may be added to the method of manufacturing the lens substrate (microlens substrate). The order of performing the respective steps in the method of manufacturing the lens substrate is not limited to the one described hereinabove but may be changed if the need arises.

In the foregoing embodiments, a composition is applied on the surface of the member with concave portions. Alternatively, the composition may be applied on, e.g., a surface of a flat panel (or a base film placed on a flat panel) and then may be pressed by the member with concave portions to thereby manufacture the lens substrate.

In the foregoing embodiments, when forming the black matrix (light shielding layer), the light (exposure light) is irradiated the base substrate in a state that the member with concave portions removed. Alternatively, the black matrix may be formed in a state that the member with concave portions is attached to the base substrate. In other words, the light may be irradiated on a material for formation of the light shielding layer through the member with concave portions.

In the foregoing embodiments, the microlens substrate (lens substrate) is provided with the diffusion portion of a layered shape. However, the shape of the diffusion portion is not limited thereto. For example, the diffusion portion may be provided in a convex shape in the portions corresponding to the apertures of the black matrix. The advantageous effects as noted hereinabove are equally attained in this case.

Moreover, formation of such a diffusion portion makes it possible to more effectively prevent reflection of an external light in the portions of the black matrix other than the apertures, thereby remarkably increasing the contrast of an image obtained. In addition, the microlens substrate may not be provided with the afore-mentioned diffusion portion at all. Furthermore, the lens substrate of the present invention may have no light shielding layer.

In the foregoing embodiments, the base substrate has the colored layer (dyeing layer) which was subject to dyeing. The base substrate may not be provided with such a colored layer at all.

In the foregoing embodiments, the microlenses have a flattened shape, as seen in a plan view, and are arranged in a houndstooth check pattern. However, the shape and arrangement of the microlenses (lens portions) is not limited thereto. For example, the shape of the microlenses when they are seen in a plan view may be generally circular or generally hexagonal. Furthermore, the microlenses may be arranged, e.g., in a square lattice pattern.

In the foregoing embodiments, the transmission type screen is provided with the microlens substrate and the Fresnel lens section. The transmission type screen of the present invention may not be necessarily provided with the Fresnel lens section. For example, the transmission type screen of the present invention may essentially consist of the microlens substrate alone.

In the foregoing embodiments, the lens substrate is used as a member for fabricating the transmission type screen and the rear projection. However, the lens substrate of the present invention is not limited to the above-noted application but may be used in many other applications. For example, the lens substrate of the present invention may find its application in a diffusion plate, a black matrix screen, a screen for projection type display devices (front projections), i.e., a front projection screen, a constituent member of a liquid crystal bulb for projection type display devices (front projections) and so forth.

What is claimed is:

1. A method of manufacturing a member with concave portions having a number of concave portions, comprising:
   preparing a base material;
   forming a mask formation film on the base material;
   forming a number of openings in the mask formation film by means of laser processing using a branching filter to obtain a mask, the branching filter having a number of light transmission portions for branching laser light which has been emitted from a laser light source into a plurality of laser beams, the light transmission portions including first light transmission portions arranged in a predetermined region for producing first laser beams and second light transmission portions arranged out of the predetermined region for producing second laser beams; and
   etching the base material on which the mask has been formed to form the concave portions in the base material;
   wherein the mask formation film has a plurality of irradiation regions each having a predetermined size, and the laser processing is carried out by performing a laser irradiation treatment with the laser beams branched by the branching filter for each of the plurality of irradiation regions in a sequential order to form the openings in the irradiation regions, in which the openings formed by the laser irradiation treatment for each of the irradiation regions including first openings which are formed inside the irradiation region by the first laser beams and second openings which are formed out of the irradiation region by the second laser beams, wherein the first light transmission portions and the second light transmission portions of the branching filter are arranged so that each of the irradiation regions has portions where no opening is formed by the first beams of the laser irradiation treatment for the irradiation region while openings will be formed in the portions of the irradiation region by the second laser beams in one or more of the subsequent laser irradiation treatments, whereby when the laser irradiation treatments have been carried out for all the irradiation regions and then the etching process is completed, a number of concave portions are formed in the base material so that the base material can have an effective area in which the concave portions are formed in an arrangement and an ineffective area which is positioned out of the effective area and in which concave portions for examination use are formed using some of the openings formed by the second laser beams used in the laser irradiation treatments for the specified irradiation regions;

wherein the portions of the irradiation region are provided on locations in the irradiation region where openings will be formed by the second laser beams in one or more of the subsequent laser irradiation treatments; and wherein in each of the laser irradiation treatments on or after the second laser irradiation treatment, the portions of the irradiation region are also provided on locations in the irradiation region where the openings have already been formed by the second laser beams in one or more of the preceding laser irradiation treatments.

2. The method as claimed in claim 1, wherein the concave portions for examination use are formed so as to be spaced apart from other concave portions in the ineffective area of the base material.

3. The method as claimed in claim 1, wherein the laser irradiation treatments are carried out by relatively moving the base material to the laser light source and the branching filter in a X-direction and a Y-direction orthogonal to the X-direction so that the plurality of irradiation regions are also moved in the same manner, wherein in the branching filter the second light transmission portions arranged at positions spaced apart from the first light transmission portions in the predetermined region in the X-direction and Y-direction.

4. The method as claimed in claim 1, wherein the each of the concave portions formed in the effective area has a flattened ellipse shape when viewed from a top of the surface of the base material where the concave portions are formed.

* * * * *